United States Patent
Nishiki et al.

(10) Patent No.: US 7,174,103 B2
(45) Date of Patent: Feb. 6, 2007

(54) OPTICAL SIGNAL CONVERTER, OPTICAL ENCODER, OPTICAL DECODER, AND OPTICAL CODE DIVISION MULTIPLEXING COMMUNICATION APPARATUS

(75) Inventors: Akihiko Nishiki, Tokyo (JP); Saeko Oshiba, Kyoto (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 622 days.

(21) Appl. No.: 10/716,709

(22) Filed: Nov. 20, 2003

(65) Prior Publication Data
US 2005/0089328 A1    Apr. 28, 2005

(30) Foreign Application Priority Data
Nov. 20, 2002   (JP)   ............................. 2002-337244
Nov. 20, 2002   (JP)   ............................. 2002-337245

(51) Int. Cl.
*H04J 14/00*   (2006.01)
(52) U.S. Cl. .................. 398/77; 398/189; 398/190
(58) Field of Classification Search .................. 398/77, 398/189, 190, 43, 79; 385/1, 37, 15; 359/154
See application file for complete search history.

(56) References Cited

U.S. PATENT DOCUMENTS

| 6,603,904 B1 * | 8/2003 | Shahar ..................... 398/79 |
| 6,614,950 B2 * | 9/2003 | Huang et al. ............... 385/37 |
| 6,628,864 B2 * | 9/2003 | Richardson et al. ......... 385/37 |
| 2002/0150334 A1 * | 10/2002 | Richardson et al. ........ 385/37 |
| 2002/0163696 A1 * | 11/2002 | Huang et al. ............. 359/154 |
| 2006/0018595 A1 * | 1/2006 | Sasaki .................... 385/37 |
| 2006/0039701 A1 * | 2/2006 | Nishiki et al. ............ 398/77 |
| 2006/0115195 A1 * | 6/2006 | Kobayashi et al. ........... 385/1 |

FOREIGN PATENT DOCUMENTS

JP   2003-244101   8/2003

OTHER PUBLICATIONS

Yusuke Nasu et al., "Multiple-phase-shift superstructure fiber Bragg gratings (MPS-SSFBG's) for dense WDM systems", Presented at OECC/IOOC2001, pp. 34-35.
Peh Chiong The et al., "8-channel Bi-directional Spectrally Interleaved OCDMA/DWDM experiment employing 16-chip, four-level phase coding gratings", Technical Digest, Jul. 2002, pp. 384-385.
Dr. H. Fathallah, Optical CDMA: Extending the Life of Optical Networks, APN, Inc.

* cited by examiner

*Primary Examiner*—David C. Payne
(74) *Attorney, Agent, or Firm*—Wenderoth, Lind & Ponack, L.L.P.

(57) ABSTRACT

An optical signal encoder/decoder includes a grating waveguide having an identical number of uniform pitch gratings to the number of code chips of a binary phase optical code, the uniform pitch gratings being formed in a waveguide direction to reflect light of a predetermined wavelength. Here, adjacent gratings corresponding to a position at which the optical code value changes are disposed a spacing apart from each other to give a phase shift of $(2m+1)\pi/2$ to the light, and the remaining adjacent gratings are disposed a spacing apart from each other to give a phase shift of $n\pi$ to the light (m, n: integer).

41 Claims, 23 Drawing Sheets

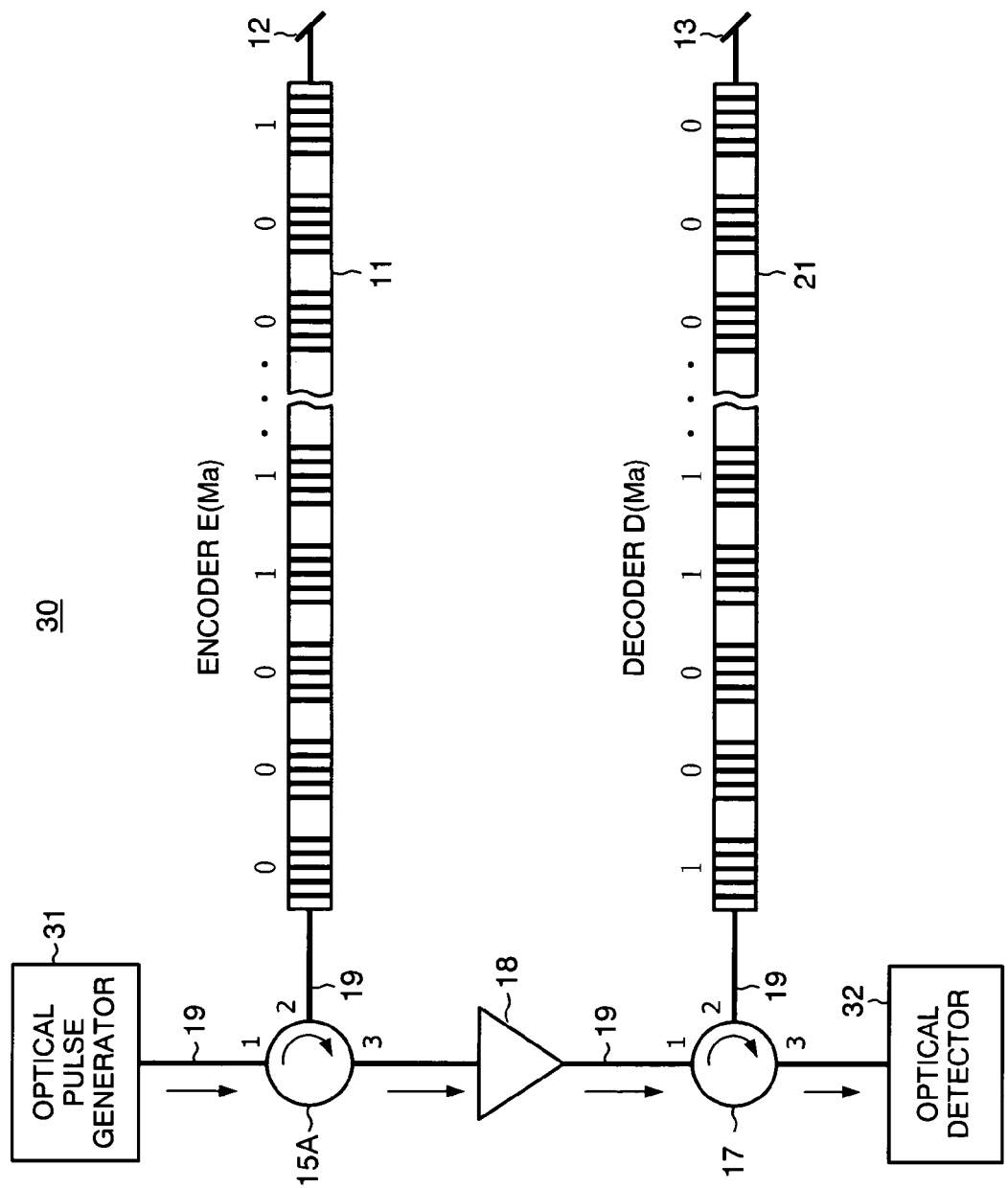

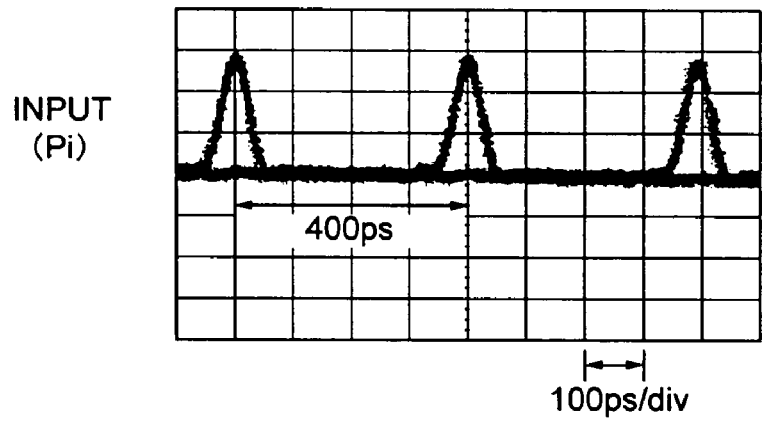
FIG. 8A  INPUT (Pi)
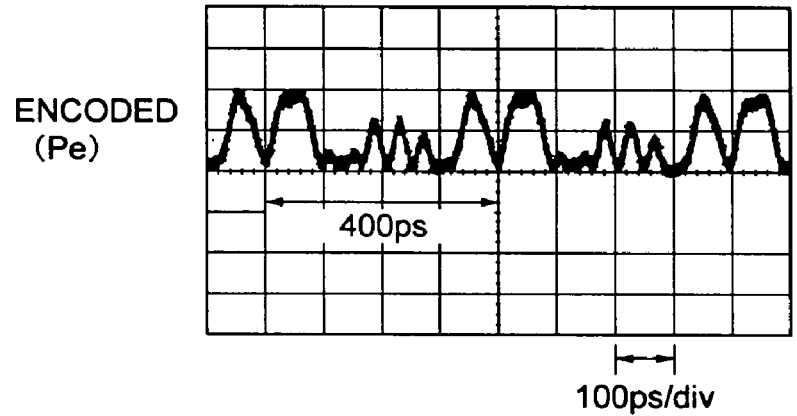
FIG. 8B  ENCODED (Pe)
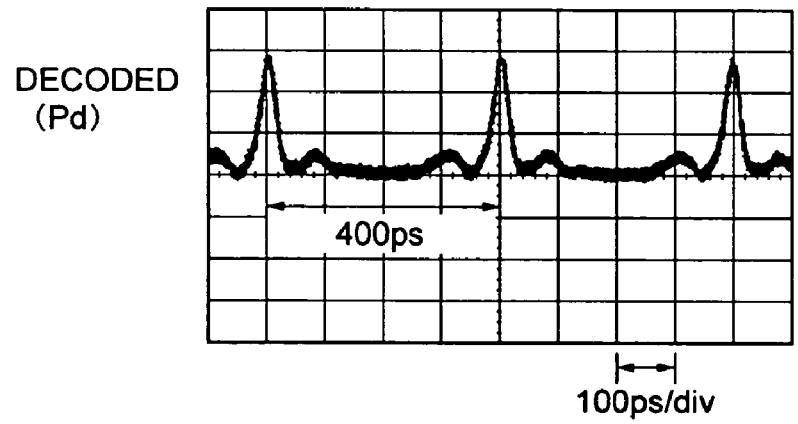
FIG. 8C  DECODED (Pd)

INPUT (Pi)

ENCODED (Pe)

DECODED (Pd)

OPTICAL SIGNAL CONVERTER, OPTICAL ENCODER, OPTICAL DECODER, AND OPTICAL CODE DIVISION MULTIPLEXING COMMUNICATION APPARATUS

BACKGROUND OF THE INVENTION

1. Field of the Invention

The present invention relates to an optical signal converter, an optical encoder, an optical decoder, an optical code division multiplexing communication apparatus, and the like for use in optical code division multiplexing communications.

2. Description of the Related Art

In recent years, the communication traffic demands have been rapidly increased due to the widespread proliferation of the Internet. The optical multiplexing communication technologies have been so far developed from an optical time domain multiplexing (OTDM) communication scheme to a wavelength division multiplexing (WDM) communication scheme to increase the communication capacities. It is an optical code division multiplexing (OCDM) communication scheme which is expected as the next generation optical multiplexing communication scheme. The OCDM communication scheme is characterized by the capability to set a plurality of communication channels in the same time slot and on the same wavelength. There are, for example, the following references related to the optical code division multiplexing communication scheme: (1) "Optical CDMA: Extending the Life of Optical Networks" (Dr. H. Fathallah, APN Inc.), http://www.stanford.edu/~supriyo/White.pdf; (2) "8-channel Bi-directional Spectrally Interleaved OCDM/DWDM Experiment Employing 16-chip, Four-Level Phase Coding Gratings, " OECC2002 (P.C. Teh et. al, OECC2002 Technical Digest 11A-1, p384–38); and (3) "Multiple-Phase-Shift Superstructure Fiber Bragg Gratings (MPS-SSFBG's) for Dense WDM Systems," Nasu et al, OECC/IOOC2001, PDP1.

However, there has been no example in which encoded signals of the same wavelength are multiplexed strictly in the same time slot. For example, it is clearly described that with encoded signals using a coherent light source, signals spread in the time direction or time axis cannot be overlapped with one another. For example, see Reference (1) supra. Also, Reference (2), for example, discloses a multiplexing transmission which uses SSFBG (Super Structure Fiber BraggGrating) based phase encoded signals. However, Reference (2) does not clearly demonstrate the structure of SSFBG except for the overall length, and characteristics except for reflection spectrum. Also, in Reference (2), the multiplexing transmission uses the WDM technology in combination, wherein a plurality of phase encoded signals at different wavelengths are multiplexed in a time domain, whereas a duration time for the encoded signals is set identical to a data period. In other words, encoded signals of the same wavelength, spread in the time axis, are not overlapped with one another, as disclosed in Reference (1).

Therefore, when signals spread in the time axis are overlapped with one another, interference among optical pulses can damage the transmission characteristics, limit the data rate, transmission distance and the like, and also causes other problems. Also, if encoded signals of the same wavelength cannot be multiplexed in the same time slot as described above, an upper limit for a data rate applicable in an optical communication system is determined by an encoder, so that the flexibility of the optical communication system is limited by the encoder.

The SSFBG disclosed in Reference (2), on the other hand, cannot be applied to a system at a data rate or higher having a data period equal to or less than a duration time (total duration) determined by the length of the encoder. For example, when the duration time is 800 ps, the SSFBG cannot be applied to a data rate of 1.25 Gbps (Gigabits per second) or higher. Further, it is effective to increase the number of code chips for increasing the number of codes for multiplexing using the SSFBG. However, a simple increase in the number of code chips would result in an increase in the length of the SSFBG, thereby further limiting the data rate to which the SSFBG can be applied.

SUMMARY OF THE INVENTION

The present invention has been made in view of the problems mentioned above, and it is an object of the invention to provide an encoder/decoder which suppress the interference among optical encoded signals to present satisfactory encoding/decoding characteristics, and a high performance optical code division multiplexing communication apparatus. It is another object of the present invention to provide a high performance encoder/decoder and optical code division multiplexing communication apparatus which have satisfactory characteristics even at a data rate having a period equal to or shorter than a duration time.

To achieve the above-described objects, according to one aspect of the present invention, there is provided an optical signal converter for use in optical code division multiplexing based on a binary phase optical code, which comprises a grating waveguide having an identical number of uniform pitch gratings to the number of code chips of the binary phase optical code, the uniform pitch gratings being formed in a waveguide direction to reflect light of a predetermined wavelength.

Here, adjacent uniform pitch gratings corresponding to a position at which the optical code value changes are disposed a spacing apart from each other to give a phase shift of $(2m+1)\pi/2$ ("m" is an integer) to the light of the predetermined wavelength, and the remaining adjacent uniform pitch gratings are disposed a spacing apart from each other to give a phase shift of $n\pi$ ("n" is an integer) to the light of the predetermined wavelength.

According to another aspect of the present invention, there is provided an optical encoder for performing binary phase optical encoding for use in an optical code division multiplexing apparatus, which comprises an optical waveguide grating having an identical number of uniform pitch gratings to the number of code chips of the binary phase optical code, the uniform pitch gratings being formed in a waveguide direction of an optical waveguide to reflect light of a predetermined wavelength.

Here, adjacent uniform pitch gratings corresponding to a position at which the optical code value changes are disposed a spacing apart from each other to give a phase shift of $(2m+1)\pi/2$ ("m" is an integer) to the light of the predetermined wavelength, and the remaining adjacent uniform pitch gratings are disposed a spacing apart from each other to give a phase shift of $n\pi$ ("n" is an integer) to the light of the predetermined wavelength.

According to another aspect of the present invention, there is provided an optical decoder for decoding an optical code division multiplexed optical signal by binary phase optical encoding, which comprises an optical waveguide grating having an identical number of uniform pitch gratings to the number of code chips of the binary phase optical code, the uniform pitch gratings being formed in a waveguide direction of an optical waveguide to reflect the optical code division multiplexed optical signal.

Here, adjacent uniform pitch gratings corresponding to a position at which the optical code value changes are disposed a spacing apart from each other to give a phase shift of $(2m+1)\pi/2$ ("m" is an integer) to the optical code division multiplexed optical signal, and the remaining adjacent uniform pitch gratings are disposed a spacing apart from each other to give a phase shift of $n\pi$ ("n" is an integer) to the optical code division multiplexed optical signal.

According to another aspect of the present invention, there is provided an optical signal converter for use in an optical code division multiplexing apparatus which performs optical code division multiplexing using binary phase optical codes, which comprises a grating waveguide encoder having an identical number of uniform pitch gratings to the number of code chips of the binary phase optical code, the uniform pitch gratings being formed in the waveguide direction of an optical waveguide through phase shift portions each for optically coupling each of the uniform pitch gratings in series in the waveguide direction, and the uniform pitch gratings reflecting light of a predetermined wavelength; and an optical attenuator optically coupled at a dead-end terminal of the grating waveguide encoder.

Here, the phase shift portions corresponding to a position at which the optical code value changes have a phase shift amount equal to $(2m+1)\pi/2$ ("m" is an integer), and the remaining phase shift portions have a phase shift amount equal to $n\pi$ ("n" is an integer).

According to another aspect of the present invention, there is provided an optical code division multiplexing apparatus for performing optical code division multiplexing using binary phase optical codes, which comprises at least one optical pulse signal generator for generating an optical pulse signal of a predetermined wavelength; and at least one grating waveguide encoder having uniform pitch gratings the number of which is identical to the number of code chips for one of the binary phase optical codes associated therewith, the uniform pitch gratings being formed in a waveguide direction of an optical waveguide to reflect the optical pulse signal from the optical pulse signal generator associated therewith, and each of the at least one grating waveguide encoder encoding the optical pulse signal from one of the optical pulse signal generators associated therewith.

Here, adjacent uniform pitch gratings corresponding to a position at which the optical code value changes are disposed a spacing apart from each other to give a phase shift of $(2m+1)\pi/2$ ("m" is an integer) to the corresponding optical pulse signal, and the remaining adjacent uniform pitch gratings are disposed a spacing apart from each other to give a phase shift of $n\pi$ ("n" is an integer) to the corresponding optical pulse signal.

According to another aspect of the present invention, there is provided an optical code division demultiplexing apparatus for demultiplexing a multiplexed optical pulse signal which is optical code division multiplexed using binary phase optical encoding, the apparatus comprises at least one grating waveguide decoder having uniform pitch gratings the number of which is identical to the number of code chips of a binary phase optical code associated therewith, the uniform pitch gratings being formed in a waveguide direction of an optical waveguide and reflecting the multiplexed optical pulse signal to generate a decoded optical signal; and at least one optical detector for detecting the decoded optical signal from the at least one grating waveguide decoder, respectively.

Here, adjacent uniform pitch gratings corresponding to a position at which the optical code value changes are disposed a spacing apart from each other to give a phase shift of $(2m+1)\pi/2$ ("m" is an integer) to the multiplexed optical pulse signal, and the remaining adjacent uniform pitch gratings are disposed a spacing apart from each other to give a phase shift of $n\pi$ ("n" is an integer) to the multiplexed optical pulse signal.

According to another aspect of the present invention, there is provided an optical code division multiplexing apparatus for performing optical code division multiplexing using binary phase optical codes, which comprises a plurality of grating waveguide encoders each having an identical number of uniform pitch gratings to the number of code chips of a binary phase optical code associated therewith, the uniform pitch gratings being formed in a waveguide direction of an optical waveguide to reflect an input optical signal, and each of the plurality of grating waveguide encoders encoding the input optical signal; and at least one delay element for delaying respective encoded signals from the plurality of grating waveguide encoders relative to one another.

Here, adjacent uniform pitch gratings corresponding to a position at which the optical code value changes are disposed a spacing apart from each other to give a phase shift of $(2m+1)\pi/2$ ("m" is an integer) to the input optical signal, and the remaining adjacent uniform pitch gratings are disposed a spacing apart from each other to give a phase shift of $n\pi$ ("n" is an integer) to the input optical signal.

According to another aspect of the present invention, there is provided an optical code division multiplexing communication apparatus for performing an optical code division multiplexing using binary phase optical codes, which comprises a plurality of optical pulse signal generators each for generating an optical pulse signal of a predetermined wavelength; a plurality of grating waveguide encoders, each having an identical number of uniform pitch gratings to the number of code chips of a binary phase optical code associated therewith, the uniform pitch gratings being formed in a waveguide direction of an optical waveguide to reflect the optical pulse signal, and each the grating waveguide encoder encoding the optical pulse signal from one of the optical pulse signal generators; and at least one delay element for delaying respective encoded signals from the plurality of grating waveguide encoders relative to one another.

Here, adjacent uniform pitch gratings corresponding to a position at which the optical code value changes are disposed a spacing apart from each other to give a phase shift of $(2m+1)\pi/2$ ("m" is an integer) to the optical pulse signal, and the remaining adjacent uniform pitch gratings are disposed a spacing apart from each other to give a phase shift of $n\pi$ ("n" is an integer) to the optical pulse signal.

BRIEF DESCRIPTION OF THE DRAWINGS

FIG. 7 is a block diagram illustrating the configuration of an encoding/decoding apparatus;

FIGS. 8A to 8C are diagrams showing the results of experiments made on an optical signal waveform Pi input to the encoder, an encoded signal waveform Pe from the encoder, and a decoded signal waveform Pd from the decoder, respectively;

DETAILED DESCRIPTION OF THE EMBODIMENTS

Figure 1:
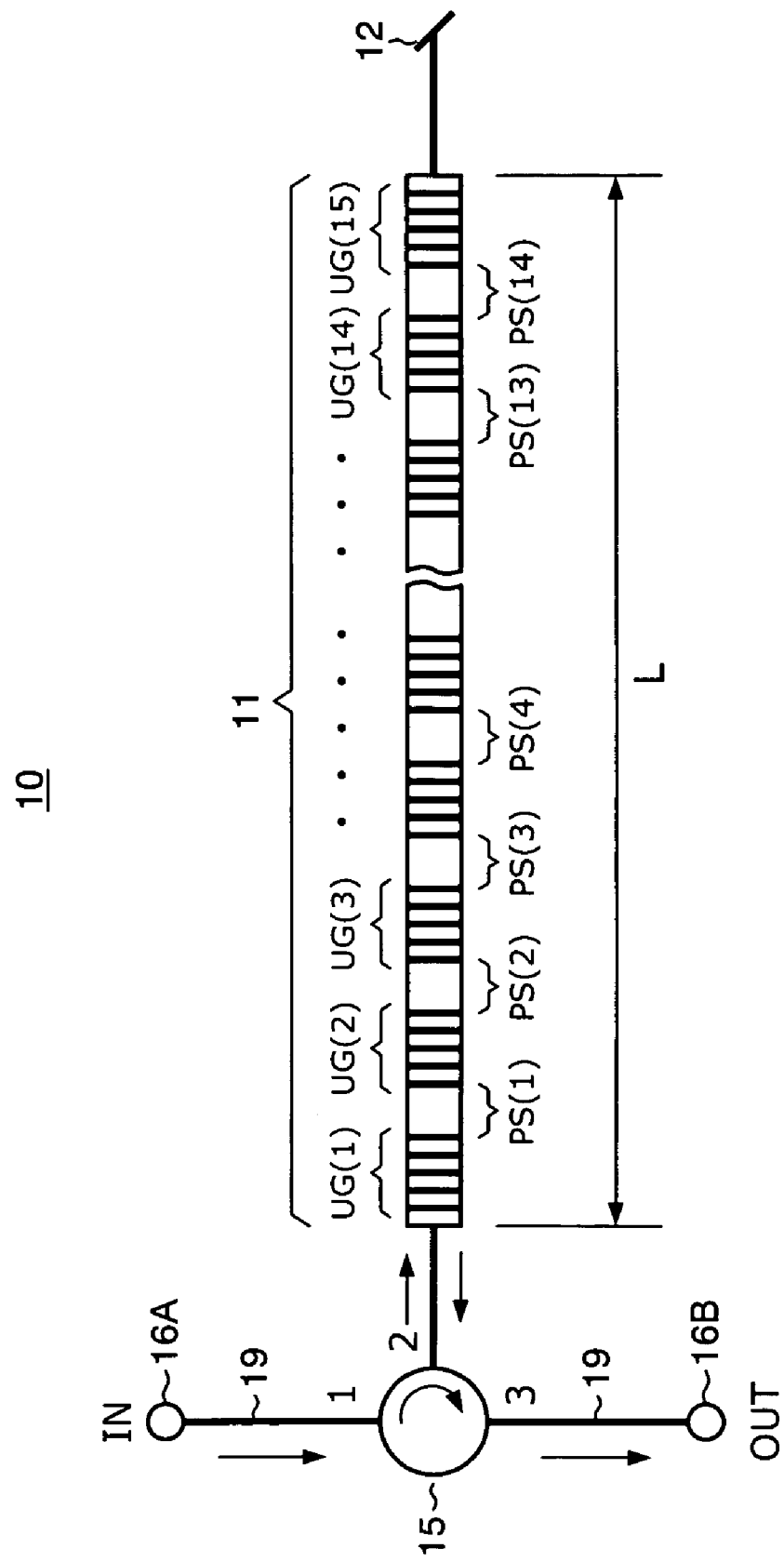
FIG. 1 is a block diagram illustrating the configuration of an optical encoding apparatus according to a first embodiment of the present invention.

Embodiments of the present invention will be described in detail with reference to the drawings. In the drawings described below, substantially equivalent parts are designated the same reference numerals.

First Embodiment

FIG. 1 is a block diagram illustrating the configuration of an optical encoding apparatus 10 according to a first embodiment of the present invention.

An optical encoder used herein is configured as a combination of a multiple phase shifted fiber Bragg grating (FBG) and an optical circulator. In more detail, the optical encoding apparatus 10 comprises an optical encoder (hereinafter, also simply referred to as an "encoder") 11 and an optical circulator 15. An optical signal input to a light input terminal 16A of the optical encoding apparatus 10 is led to a first port of the optical circulator 15 through an optical fiber 19, passes a second port of the optical circulator 15, and is reflected by the optical encoder 11. An optical terminator or an optical attenuator 12 is connected to a dead-end terminal of the optical encoder 11 for providing attenuation approximately of −50 dB. The reflected optical signal from the optical encoder 11 is led to a light output terminal 16B through a second port and a third port of the optical circulator 15.

The optical encoder (multiple phase shifted FBG) 11 comprises a "p" number of uniform-pitch gratings (hereinafter, also simply referred to as the "uniform gratings") UG(i) (i=1, 2, ..., p) having substantially the same Bragg frequency or Bragg wavelength, which are coupled in series with each other through phase shifters or phase-shift portions PS(i) (i=1, 2, ..., p−1). For example, by periodically changing the refractive index of the core of an optical fiber, a resulting phase sift fiber grating is formed with a plurality of uniform pitch Bragg diffraction gratings within the optical fiber. The optical encoder 11 is not limited in configuration to the fiber grating. For example, the optical encoder 11 may be comprised of an optical waveguide and a multiple phase shifted structure optically coupled to the optical waveguide. For example, the optical encoder 11 may be configured as a planar structure multiple-phase-shifted grating which has a plurality of uniform pitch Bragg diffraction gratings within a planar optical waveguide. Also, the uniform pitch gratings UG(i) need not always have the same Bragg wavelength. Specifically, the uniform pitch gratings UG(i) are only required to be configured to reflect input signal light. In other words, the multiple-phase-shifted grating serves as an optical encoder or converter when the uniform pitch gratings are formed to provide reflected light. For example, the Bragg wavelength $\lambda b$ of the uniform pitch gratings UG(i) preferably falls within a range represented by $\lambda p - \Delta\lambda \leq \lambda b \leq \lambda p + \Delta\lambda$, where $\lambda p$ is the wavelength of pulse signal light, and $\Delta\lambda$ is the wavelength corresponding to the inverse of a chip time difference (i.e., chip rate) or chip period (Tchip) of an encoded signal. In this embodiment, the inverse of the chip period, i.e., chip frequency, is approximately 42 GHz since the chip period is 24 ps. In a 1550-nm wavelength band, the wavelength ($\Delta\lambda$) corresponding to the frequency is approximately 0.34 nm. Also, more preferably, the uniform pitch gratings UG(i) have substantially the same Bragg wavelength, as mentioned above.

Further, at least one of the uniform pitch gratings UG may be an apodized grating. More specifically, the uniform pitch grating UG may be formed to have a structure in which the modulation index or modulation factor of the refractive index is reduced at both ends or one end of the optical waveguide in the waveguide direction. The use of the apodized grating can improve a broadening of a reflected pulse in a time axis by the grating, which will be later described in detail. The apodized grating can also prevent cancellation of adjacent optical pulses in a phase inversion relationship to each other which causes a power loss. In addition, all the uniform pitch gratings UG may be formed to be apodized gratings. Alternatively, the apodization of grating may be applied to one or both of adjacent uniform pitch gratings corresponding to a position at which optical code value changes. In other words, the apodization may be applied to adjacent uniform pitch gratings at positions, where a phase difference between reflected lights is to $\pi$, as will be later described. Alternatively, uniform pitch gratings UG at proper positions may be apodized gratings.

The following description will be made on an example in which the present invention is applied to an encoder for use in binary phase encoding of M-sequence 15-chip.

Figure 2:
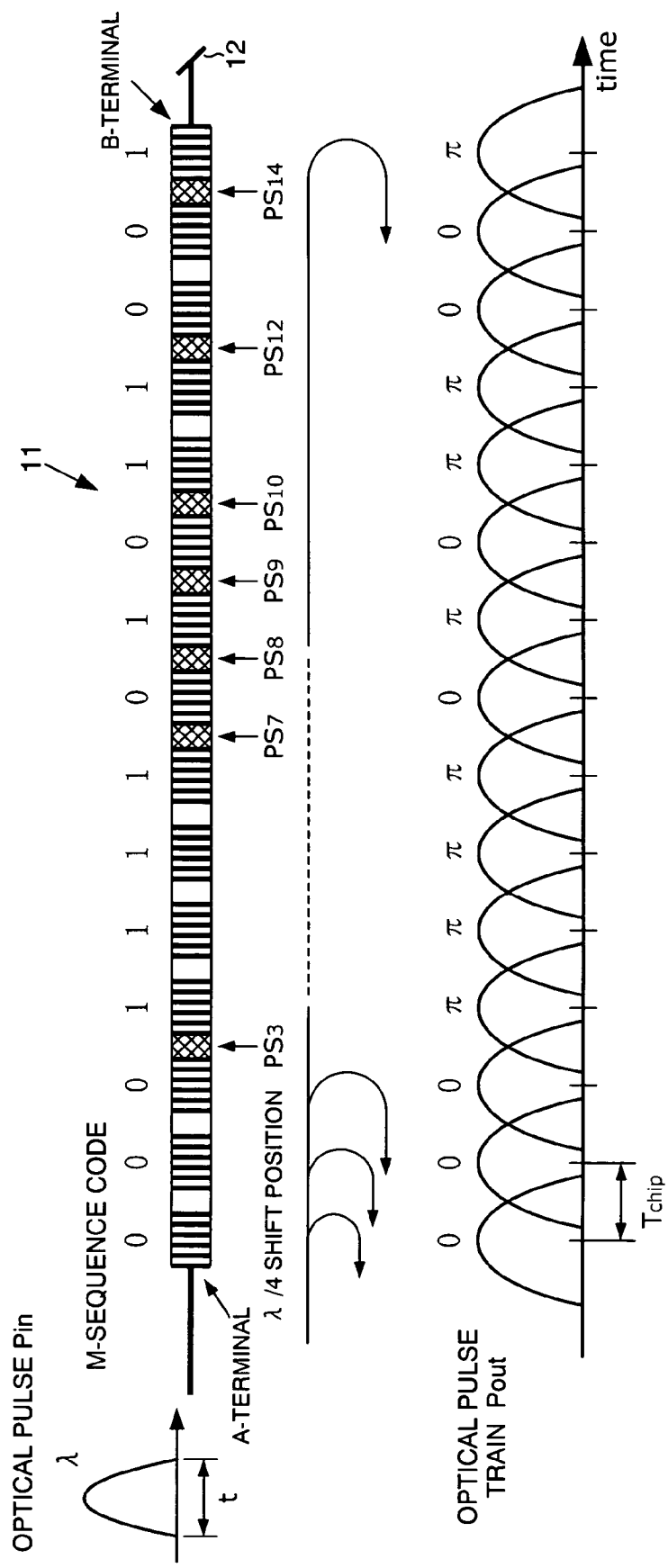
FIG. 2 is a schematic diagram illustrating the configuration and encoding operation of an optical encoder.

FIG. 2 is a schematic diagram illustrating the configuration and encoding operation of the optical encoder 11. The optical encoder 11 has phase shift portions PS(i) (i=1, 2, ..., 14) disposed between respective uniform gratings UG(i) (i=1, 2, ..., 15). A phase shift amount for each of the phase shift portions PS(i) is determined corresponding to each chip of the M-sequence code. More specifically, UG(1), UG(2), UG(3), UG(4), ..., UG(14), UG(15) correspond to 0, 0, 0, 1, ..., 0, 1, respectively, when the 15-chip M-sequence code used herein is Ma (000111101011001). Also, the phase shift portions PS(i) which correspond to positions at which code chips "0" and "1" (or "1" and "0") are adjacent (in other words, positions at which the optical code value transitions) are formed to have a phase shift amount of $\pi/2$. Stated another way, the phase shift portions PS(i) are formed to provide a phase difference of $\pi/2$ ($=\lambda/4$) for the wavelength of incident light within the waveguide, and to provide the light propagating to and fro with a round-trip phase shift of $\pi$. On the other hand, the phase shift portions PS(i) which correspond to positions at which "0" is adjacent to "0" (or "1" is adjacent to "1") are formed to have a phase shift amount of $\pi$. Stated another way, these phase shift portions PS(i) are formed to provide a phase difference of $\pi$ ($=\lambda/2$) for the wavelength of incident light within the waveguide, and to provide the light propagating to and fro with a round-trip phase shift of $2\pi$ (i.e., phase shift equal to zero).

Thus, for light which goes and returns through the phase shift portions PS, the phase shift amount equal to $\pi/2+m\pi=(2m+1)\pi/2$ ("m" is an integer) is equivalent to the phase shift amount equal to $\pi/2$ (i.e., round-trip phase shift of $\pi$). Similarly, the phase shift amount equal to $0+n\pi=n\pi$ ("n" is an integer) is equivalent to the phase shift amount equal to $\pi$ (i.e., round-trip phase shift of 0). Here, description will be made on the assumption that the phase shift amounts are $\pi/2$ or $\pi$, respectively, including equivalent phase shift amounts.

Specifically, when the above-described M-sequence code Ma is used, the phase shift portion PS(3) at a position corresponding to UG(3) and UG(4), at which "0" is adjacent to "1," is formed to have a phase shift amount of $\pi/2$. Similarly, each of the phase shift portions PS(7), PS(8), PS(9), PS(10), PS(12), PS(14) is formed to have a phase shift amount of $\pi/2$ ($=\lambda/4$). The remaining phase shift portions PS(i) have a phase shift amount of $\pi$ ($=\lambda/2$).

Figure 3:
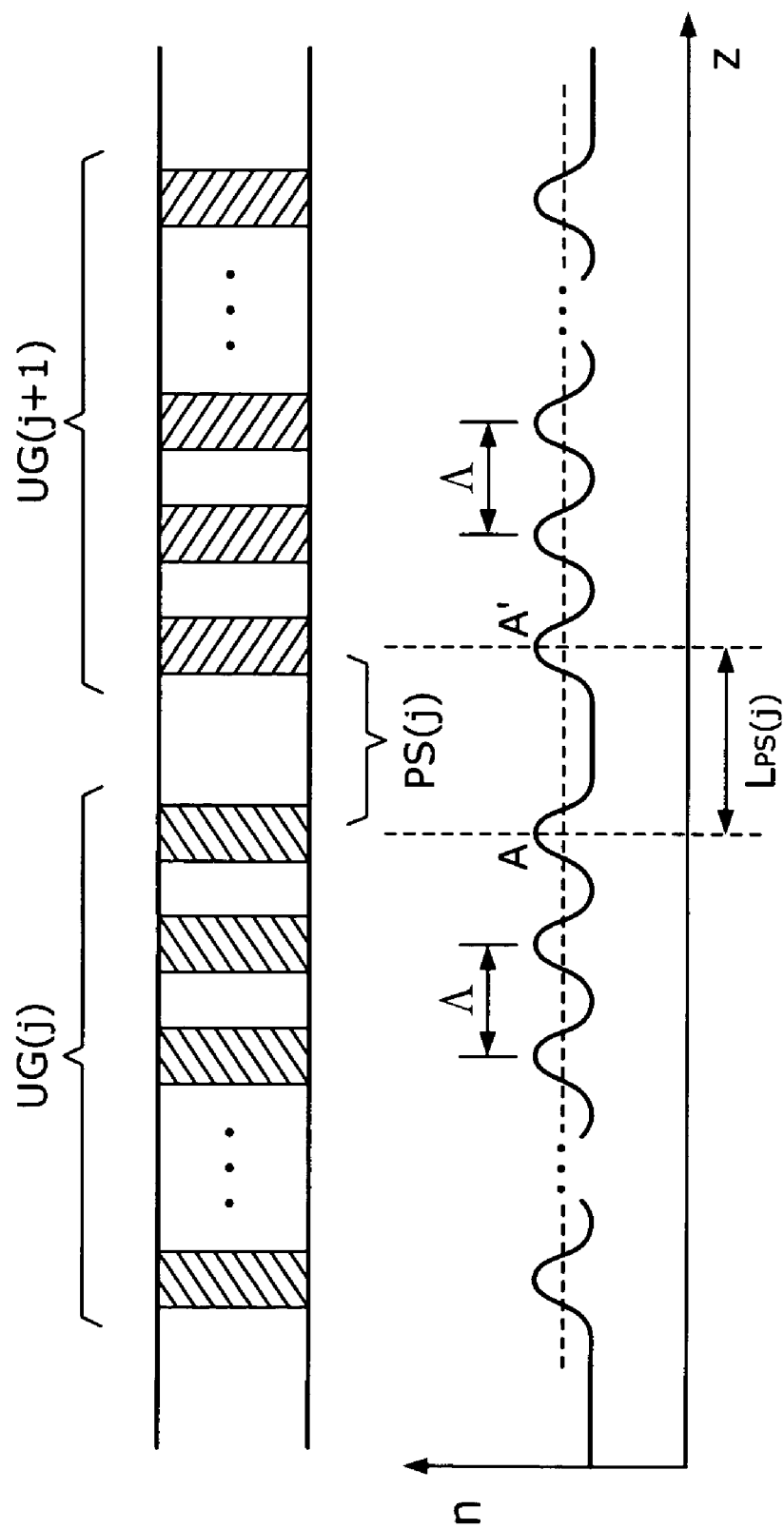
FIG. 3 is a diagram schematically showing the configuration of uniform gratings UG and phase shifter PS, and a change in refractive index (n) in the axial direction of a fiber in the optical encoder, i.e., in a waveguide propagation direction (i.e., waveguide direction or z-direction)

FIG. 3 schematically shows the configuration of the uniform gratings UG and phase shift portion PS, and a change in refractive index n(z) in the axial direction of a fiber in the optical encoder, i.e., in a waveguide propagation direction or z-direction (hereinafter, simply referred to as the "waveguide direction"). FIG. 3 shows a phase shift portion PS(j) having the phase shift amount of $\pi/2$ and uniform gratings UG(j), UG(j+1) on both sides of the phase shift portion PS(j). The uniform grating UG(j) has a length $L_U(j)$ and a refractive index n(z) which changes at a regular pitch or period $\Lambda$ (grating period). The uniform grating UG(j) selectively reflects only light of a wavelength which satisfies the Bragg condition. On the other hand, the uniform grating UG(j+1) has a length $L_U(j+1)$ and a refractive index n(z) which changes at a regular pitch or period $\Lambda$ (grating period), like the uniform grating UG(j). In this embodiment, all uniform gratings UG(i) (i=1, 2, ..., 15) are substantially identical in structure and length ($=L_U$).

The uniform gratings UG(j) and UG(j+1) are disposed a predetermined spacing apart from each other, by way of the phase shift portion PS(j). More specifically, the length $L_{PS}$ of the phase shift portion PS(j) is expressed by the following equation:

$$L_{PS}=(2m+1)\cdot\lambda_B/4n_{\mathit{eff}} \qquad (1)$$

where $\lambda_B$ (wavelength in vacuum) is a reflection wavelength of the uniform gratings UG(j), UG(j+1), $n_{\mathit{eff}}$ is an effective refractive index in a fiber portion in which the phase shift portion PS(j) is disposed, "m" is an integer equal to or larger than zero (m=0, 1, 2, ...), and $\lambda_B/n_{\mathit{eff}}$ on the right side represents the wavelength within the waveguide.

Specifically describing with reference to FIG. 3, the length $L_{PS}(j)$ of the phase shift portion PS(j) is given by the distance between the closest same phase positions of the uniform gratings UG(j), UG(j+1) (e.g., positions A, A' at which the refractive index n(z) reaches the peak).

When light (having a wavelength $\lambda_c$ in vacuum) is incident on one end of the uniform gratings UG(j), UG(j+1), a phase difference between reflected lights from the respective uniform gratings UG(j), UG(j+1) can be controlled by changing the length $L_{PS}$ of the phase shift portion PS(j). As described above, when the length $L_{PS}$ of the phase shift portion PS(j) is determined to form the $\lambda/4$ phase shift structure, the phase shift portion PS(j) has the phase shift amount of $\pi/2$, so that there is a phase difference of $\pi$ between the reflected lights from the respective uniform gratings UG(j), UG(j+1).

When the uniform gratings UG(j), UG(j+1) are first-order gratings, a phase shift of $\lambda/4$ corresponds to $\Lambda/2$ ($\Lambda$ is the grating period). However, the uniform gratings UG(j), UG(j+1) are not limited to first-order gratings, but higher-order gratings can be used instead.

On the other hand, the length $L_{PS}$ of each of the phase shift portions PS(k) (k=1, 2, 4, 5, 6, 11, 13), which have the phase shift amount of $\pi$, is expressed by the following equation:

$$L_{PS}=(2n+1)\cdot\lambda_B/2n_{\mathit{eff}} \qquad (2)$$

where "n" is an integer equal to or larger than zero (n=0, 1, 2, ...), and $\lambda_B/2n_{\mathit{eff}}$ on the right side represents the wavelength within the waveguide.

When the length $L_{PS}$ of the phase shift portion PS(k) is chosen to satisfy the foregoing condition, the phase shift portion PS(k) has a phase shift amount equal to $\pi$. Therefore, the phase difference is $2\pi$ between reflected lights from the respective uniform gratings UG(j), UG(j+1) on both sides of the phase shift portion PS(k). Since the phase difference of 2π causes the reflected lights to match in phase, the phase difference equal to 2π is equivalent to substantial elimination of phase difference between the reflected lights (i.e., the phase difference is zero).

In the following, phase shift portions which provide a phase difference of π between reflected lights are collectively referred to as "PS1," and phase shift portions which provide a phase difference of zero are collectively referred to as "PS0" for simplifying the description.

While FIG. 3 shows that the uniform grating UG(i) has a sinusoidal refractive index distribution profile, the uniform gratings UG(i) are not limited to have such a profile. Specifically, the uniform gratings UG(i) (i=1, 2, ..., 15) are only required to have a change in the refractive index at a regular period and serves as uniform pitch Bragg gratings. For example, the uniform gratings UG(i) may have a refractive index distribution profile of rectangular shape, triangular shape, etc.

In the embodiment, the grating period (or grating pitch) Λ is chosen to be 535.5 nm (nanometer), and the length $L_U$ of the uniform grating UG(i), which comprise one chip of a code, is approximately 2.346 mm (millimeter), i.e., 4380 times as long as the grating period. Therefore, the total length of all the uniform gratings amounts to approximately 35.19 mm (=2.346 mm×15), and the overall length L of the multiple phase shifted FBG is calculated by adding the lengths of all the phase shift portions to the total length of the uniform gratings, so that the overall length of the multiple phase shifted FBG is changed depending on a selected code pattern. In this embodiment, the λ/4 phase shift portion PS1 which provides an optical signal with a round-trip phase difference of π has the length of Λ/2 (=535.5/2=267.75 nm), and the remaining phase shift portion PS0 which provides an optical signal with a round-trip phase difference of zero has the length of zero.

As an optical pulse is incident on the encoder 11 which is the multiple phase shifted FBG as described above, the incident optical pulse (Pin) propagates through the multiple phase shifted FBG, wherein the optical pulse is reflected from the respective uniform gratings, and the resulting reflected optical pulses interfere with one another to generate an optical pulse train (Pout). An incident terminal of the encoder 11, on which the optical pulse is incident, is called an "A-terminal," and the other terminal, a "B-terminal." More specifically, the optical pulse Pin undergoes a propagation delay in addition to a phase difference in accordance with the phase shift amounts of the phase shift portions. The propagation delay time is determined in accordance with the lengths of the uniform gratings and the spacing therebetween. Specifically, the round-trip propagation delay time (hereinafter, also referred to as the "chip period") produced by adjacent uniform gratings is expressed by the following equation:

$$Td = 2n_{eff} \cdot D/c \qquad (3)$$

where "c" is the velocity of light, and D is the spacing between the reflection center positions of the adjacent uniform gratings. The inverse of the chip period is called the "chip rate."

In this embodiment, the wavelength of the incident optical pulse Pin (in vacuum) is chosen to be $\lambda_B$=1550 nm, and the period (pitch) of the uniform gratings UG is determined such that the Bragg wavelength is substantially the same as the incident light wavelength. In other words, the Bragg wavelength $\lambda_B$ of the uniform gratings UG is chosen to be 1550 nm (in vacuum) ($\lambda_B$=1550 nm). The incident optical pulse Pin has an optical pulse width (FWHM: full width at half maximum) of 24 ps (picoseconds), and adjacent uniform gratings cause a propagation delay time Td of 24 ps. In other words, the length of each uniform grating UG is set to be substantially equal to an optical path length corresponding to the optical pulse width (24 ps). However, as described later, the optical pulse width need not be the same as the propagation delay time Td. Therefore, the optical pulse train Pout generated by the encoder 11 is composed of optical pulses which have a time interval of 24 ps between the respective pulses, and a phase difference in accordance with the phase shift amounts of the associated phase shift portions (i.e., zero or π). Specifically, as shown in FIG. 2, the optical pulse train is generated at a period of 24 ps with respective pulses having a phase difference of 0, 0, 0, π, π, π, π, 0, π, 0, π, π, 0, 0, π corresponding to the M-sequence code Ma (000111101011001).

Figure 4:
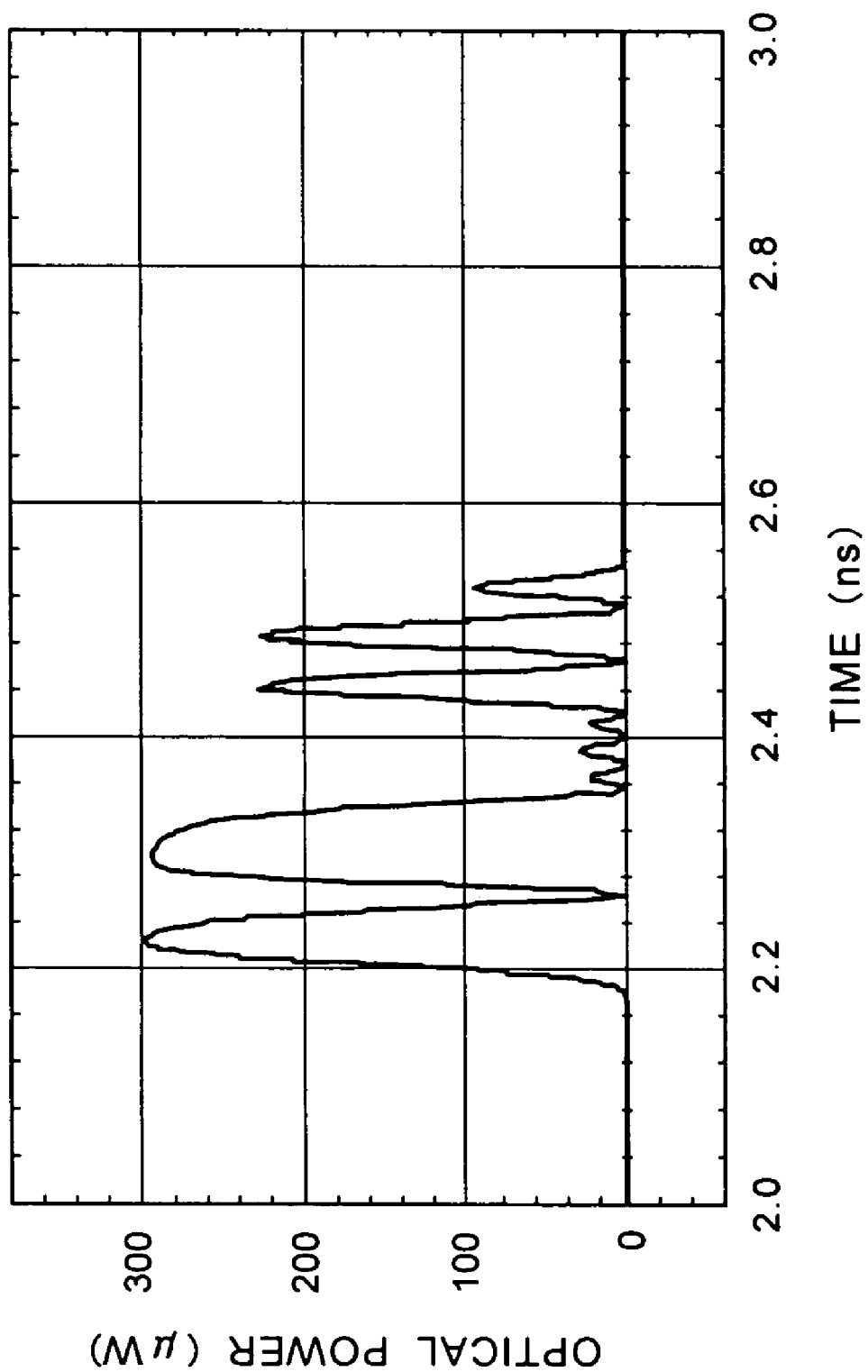
FIG. 4 is a diagram showing the result of a waveform simulation for an optical pulse train which is generated when an encoder is applied with an RZ optical pulse signal which has a pulse half width of 24 ps.

FIG. 4 shows a simulation result of a waveform for an optical pulse train which is generated when the encoder 11 is applied with an RZ (Return-to-Zero). optical pulse signal, the pulse half width of which is 24 ps. The input RZ optical pulse signal is reflected by the uniform grating UG, which comprises each chip, to generate an optical pulse train which is spread over a time range (total duration) of approximately 360 ps, as shown in FIG. 4. The optical pulse train is binary encoded by the phase. In the encoded waveform shown in FIG. 4, when reflected pulses from the uniform gratings corresponding to the respective chips are continuously the same in phase, the optical powers of overlapping portions of the optical pulses are added to one another to result in a pulse having a high peak value and a wide width. On the other hand, when the adjacent reflected pulses are in opposite phase, the optical powers of overlapping portions of optical pulses out of phase cancel one another to result in a separate optical pulse having a low peak value. In this way, the input optical pulse signal is encoded to generate an encoded pulse train Pe.

Figure 5:
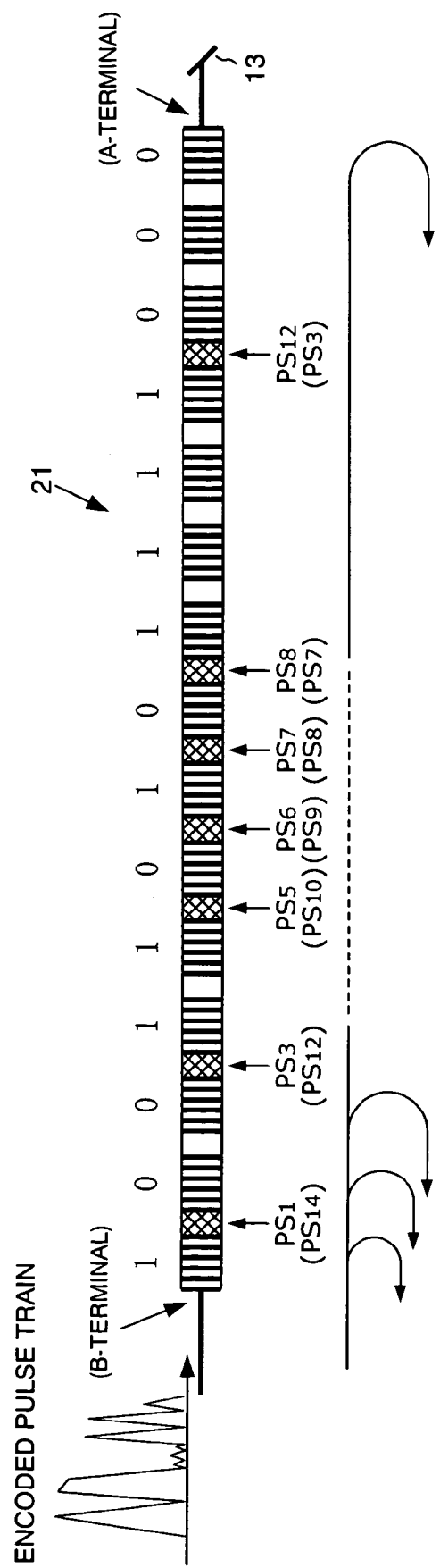
FIG. 5 is a schematic diagram illustrating the configuration and decoding operation of an optical decoder.

Description will be made on decoding of the encoded pulse signal. FIG. 5 is a schematic diagram illustrating the configuration and decoding operation of an optical decoder 21. The optical decoder 21 has a configuration corresponding to an M-sequence code (100110101111000) which is the inverse in order of the M-sequence code Ma (000111101011001) associated with the optical encoder 11. In other words, the optical decoder 21 is a multiple phase shifted FBG which comprises the uniform gratings UG and phase shift portions PS, components of the optical encoder 11, arranged in the reverse order. Specifically, the optical decoder 21 is simply equivalent to the inverse of the optical encoder 11 with the B-terminal of the optical encoder 11 being used as an input terminal and the A-terminal of the same as a dead-end terminal. An optical terminator is connected to the dead-end terminal of the optical decoder 21 for providing approximately −50 dB of optical attenuation. In FIG. 5, reference numerals of corresponding components in the optical encoder 11 (FIG. 2) are shown in parenthesis for ease of understanding.

Figure 6:
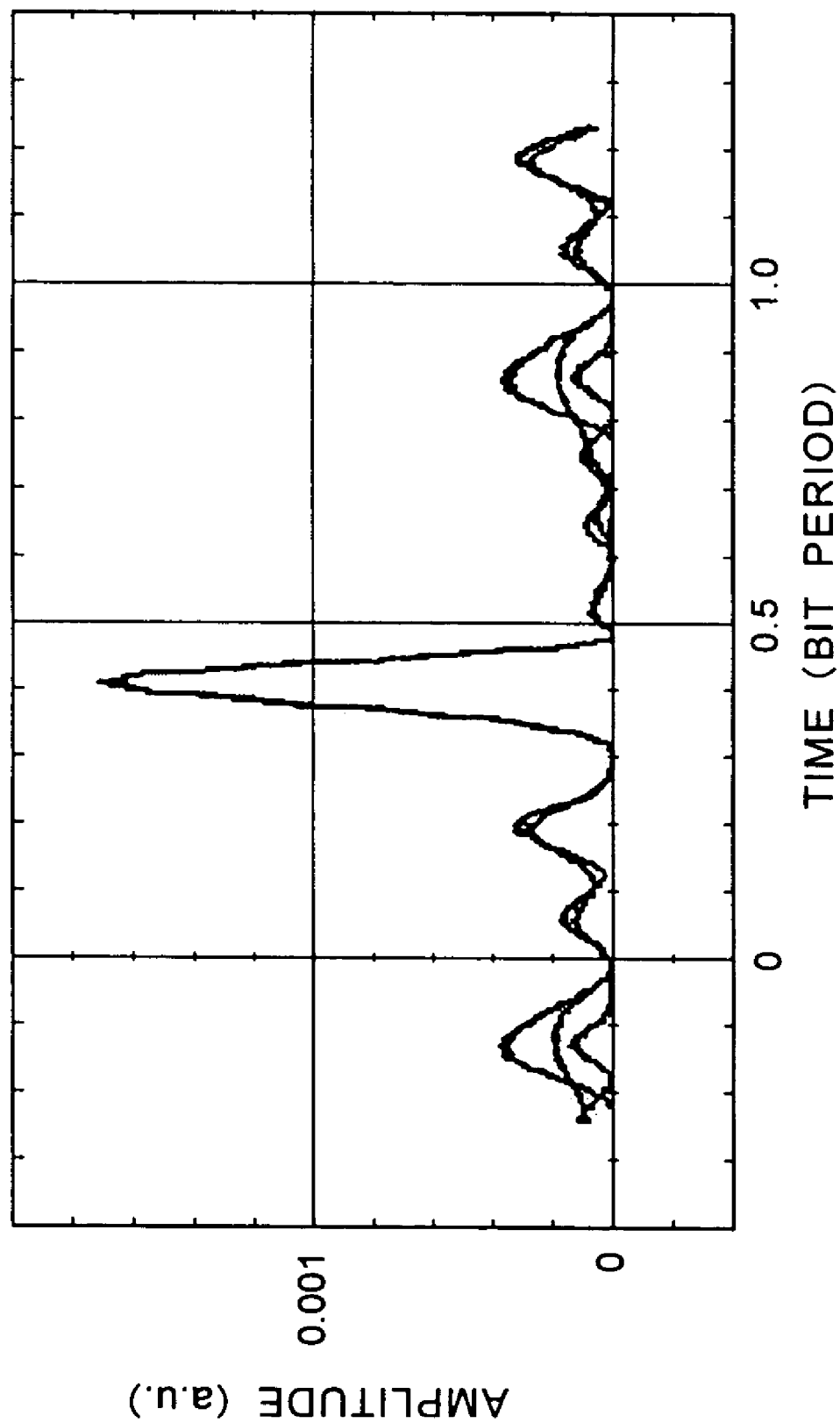
FIG. 6 is a diagram showing an auto-correlation waveform generated by the decoder.

As an RZ optical signal encoded by the optical encoder 11 is input to the decoder 21, optical pulses reflected from respective chips with the influence of phase shift are superimposed with time differences or chip periods (or propagation delay times), and interfere with one another with their respective relative phase differences to generate an auto-correlation waveform as shown in FIG. 6. FIG. 6 represents the magnitude of the auto-correlation waveform in an arbitrary unit (a.u.) with respect to time in units of bit periods.

In this way, the encoded (or converted) optical pulse signal is decoded (or inversely converted).

FIG. 7 illustrates the configuration of an encoding/decoding apparatus 30. The encoding/decoding apparatus 30 comprises the aforementioned encoder 11 and decoder 21, and serves as an optical communication apparatus as well. In the encoding/decoding apparatus 30, an optical pulse generator 31 generates an optical RZ signal which has an optical pulse half width (FWHM) of 24 ps, and a data rate of 2.5 Gps. The generated optical RZ signal is input to the encoder E(Ma) 11 through an optical circulator 15A. The encoder 11 encodes the input optical RZ signal in accordance with the M-sequence code Ma. FIGS. 8A and 8B show an optical signal waveform Pi input to the encoder 11, and an encoded signal waveform Pe from the encoder 11, respectively. It can be seen that the resulting encoded signal waveform (optical pulse train) Pe has a total duration of approximately 360 ps, and a period of 2.5 Gps.

The encoded optical pulse train Pe is amplified by an optical amplifier 18, and then input to the decoder D(Ma) 21 through an optical circulator 17. As described above, the decoder 21 is configured to decode an encoded signal in accordance with the M-sequence code Ma. A decoded optical signal from the decoder 21 is received by an optical detector 32 for conversion into a decoded electric signal. FIG. 8C shows the result of an experiment made on a decoded signal waveform Pd from the decoder 21. It can be seen that the resulting decoded waveform is sufficiently practicable.

As described above, it is appreciated that the multiple phase shifted FBG can be used in an encoder and a decoder to provide sufficiently satisfactory encoding/decoding characteristics.

Second Embodiment

Figure 9:
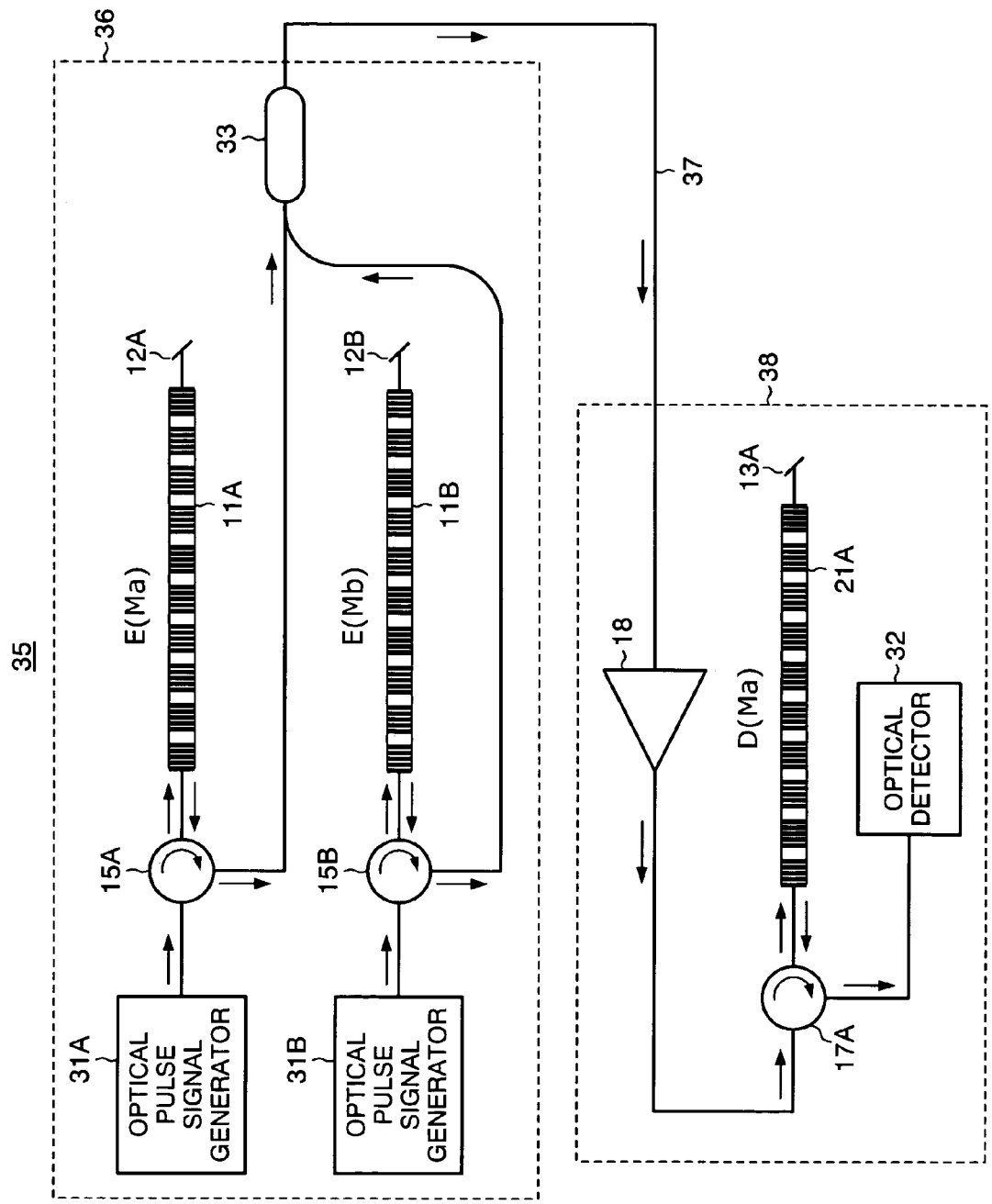
FIG. 9 is a block diagram illustrating the configuration of an optical code division multiplexing (OCDM) communication apparatus according to a second embodiment of the present invention.

FIG. 9 is a block diagram illustrating the configuration of an optical code division multiplexing (OCDM) communication apparatus 35 according to a second embodiment of the present invention. The optical code division multiplexing communication apparatus 35 comprises an OCDM transmitter 36, an optical fiber 37, and an OCDM receiver 38. The OCDM transmitter 36 comprises optical pulse signal generators 31A, 31B; optical circulators 15A, 15B; optical encoders 11A, 11B; optical terminators 12A, 12B; and an optical coupler 33.

The optical pulse signal generator 31A, the optical circulator 15A, the optical terminator 12A, and the optical encoder 11A make up a first transmission channel, while the optical pulse signal generator 31B, the optical circulator 15B, the optical terminator 12B, and the optical encoder 11B make up a second transmission channel. The optical pulse signal generators 31A, 31B generate optical RZ signals which have substantially the same wavelength, an optical pulse half width of 24 ps, and a data rate of 2.5 Gps. The optical pulse signal from the optical pulse signal generator 31A is encoded by the optical encoder E(Ma) 11A corresponding to an M-sequence code Ma, while the optical pulse signal from the optical pulse signal generator 31B is encoded by the optical encoder E(Mb) 11B corresponding to an M-sequence code Mb (000100110101111) which is different from the M-sequence code Ma (000111101011001). The encoded signals from the first and second transmission channels are combined by the optical coupler 33, and transmitted through the optical fiber 37. The optical circulators 15A, 15B, the optical encoders 11A, 11B, and the optical coupler 33 make up a multiplexing apparatus for multiplexing two optical signals in accordance with the optical code division multiplexing scheme.

In the OCDM receiver 38, an OCDM signal received through the optical fiber 37 is amplified in an optical amplifier 18 having a predetermined gain. The amplified OCDM signal is transferred through the optical circulator 17A to be decoded by the optical decoder 21A. An optical terminator 13A is connected to the dead-end terminal of the optical decoder 21. The optical decoder D(Ma) 21A is configured to decode an optical signal encoded by the optical encoder E(Ma) 11A. Specifically, as is the case with the first embodiment, the optical decoder D(Ma) 21A comprises a multiple phase shifted FBG which has the uniform gratings UG and phase shift portions PS, components of the optical encoder E(Ma) 11A, arranged in the reverse order. Alternatively, the optical decoder D(Ma) 21A may have the configuration of an optical decoder D(Mb) for decoding an optical signal encoded by the optical encoder E(Mb) 11B. The decoded optical signal is received by the optical detector 32 for conversion into an electric signal.

Figure 10:
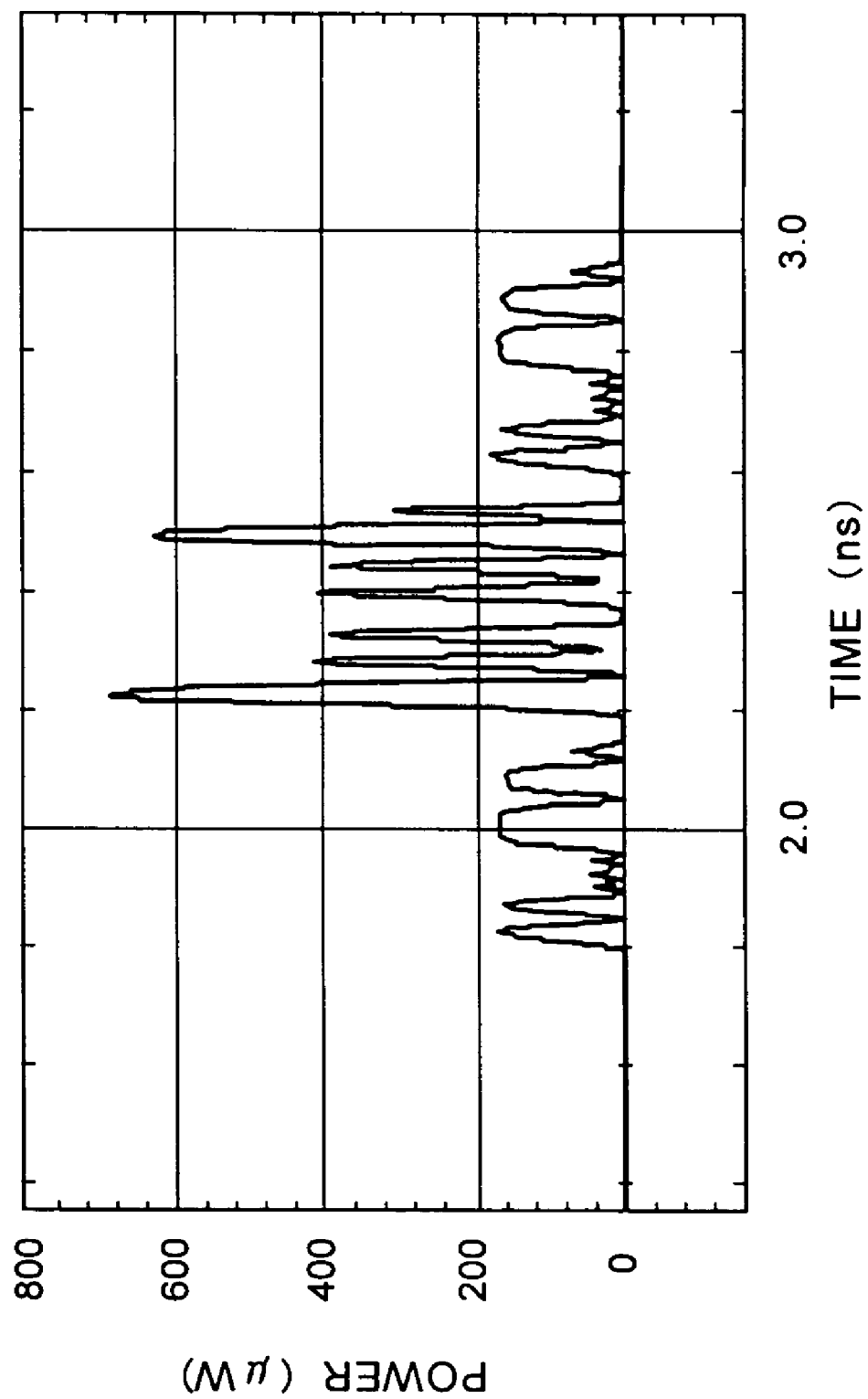
FIG. 10 is a diagram showing the result of a simulation for multiplexed signal waveforms corresponding to (0,1,0) of an M-sequence code Ma and (1,1,1) of an M-sequence code Mb of an optical code division multiplexed signal waveform.
Figure 11:
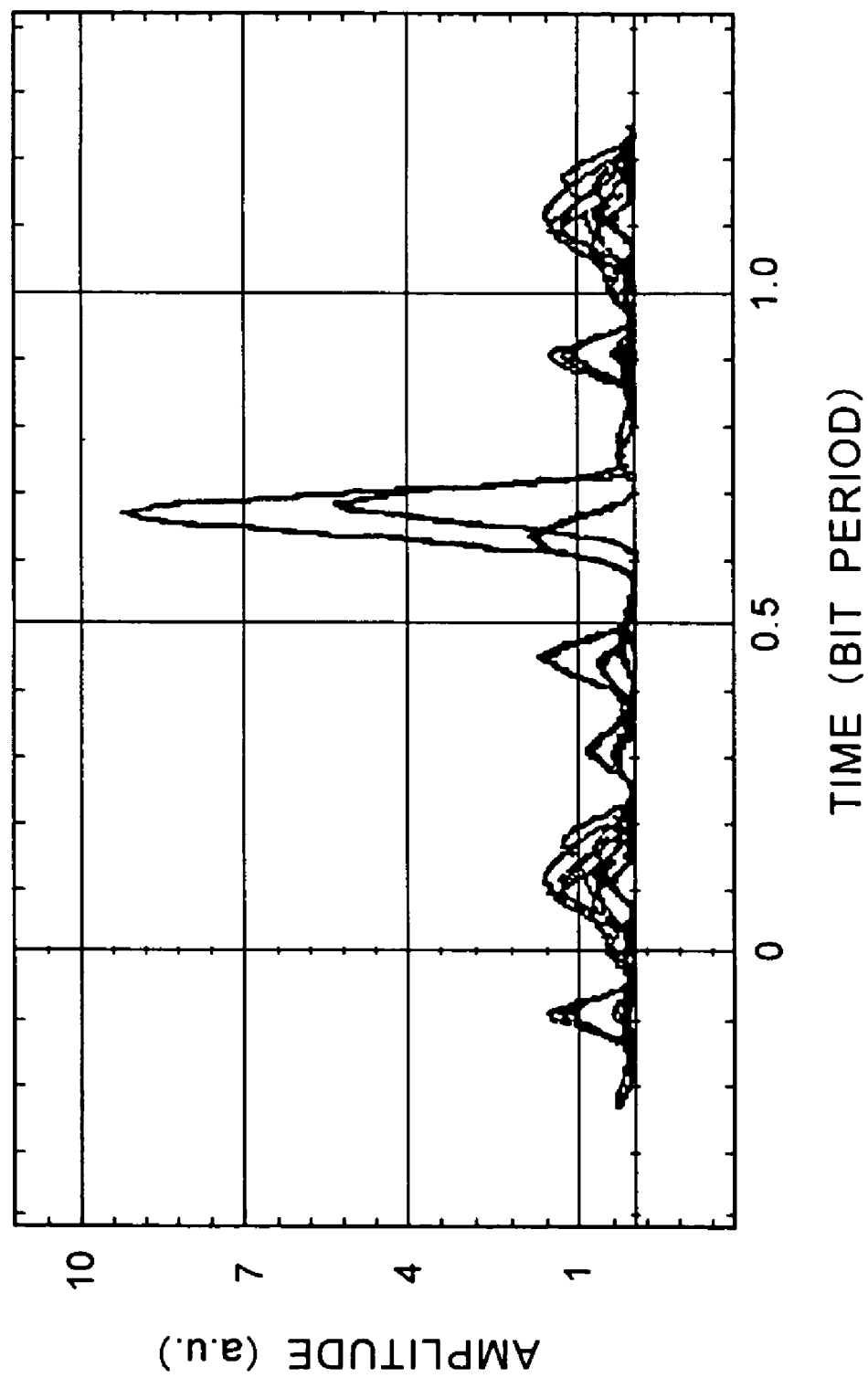
FIG. 11 is a diagram showing the result of a simulation for a decoded signal waveform (eye pattern) decoded from an optical code division multiplexed signal.

FIGS. 10 and 11 show the results of simulations for signal waveform portions corresponding to (010) of the M-sequence code Ma and (111) of the M-sequence code Mb within the optical code division multiplexed signal waveform, and a decoded signal waveform (eye pattern), respectively. It can be seen from these results that the encoding and decoding can be sufficiently practicable in the optical code division multiplexing apparatus.

It should be noted that various numerical values associated with optical signals such as the optical pulse width, data rate and the like, as well as various numerical values associated with the optical encoder such as the number of code chips, grating length, phase shift length and the like indicated in the foregoing embodiment are merely illustrative, and can be modified as required. For example, while the optical pulse width and propagation delay time Td are chosen to be 24 ps in the embodiment described above, the present invention is not limited to this particular value, and the values can be chosen as appropriate in accordance with a particular data rate, number of code chips, uniform grating length, and the like. Alternatively, the values may be determined in accordance with required transmission characteristics. Specifically, in the foregoing embodiment, the optical pulse width is set (to be 24 ps) when the data rate and the number of code chips are chosen to be 2.5 Gps and 15, respectively, such that the total duration of the optical encoded waveform is equivalent to or shorter than the time slot (400 ps) at this data rate. Alternatively, an optical signal having a narrower pulse width may be used. On the contrary, an optical signal having a wider pulse width than 24 ps can be used as well. In addition, the propagation delay time Td can be set independently of the optical pulse width.

Third Embodiment

Figure 12:
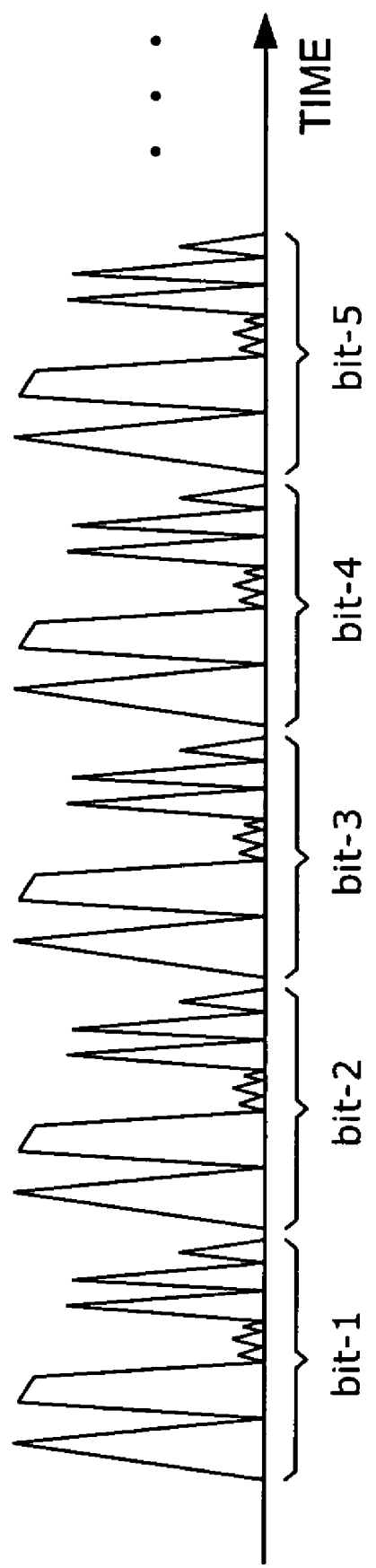
FIG. 12 is a schematic diagram showing an encoded optical signal waveform with respect to the time axis when the data rate is at 2.5 Gps.

In the first and second embodiments described above, the total duration of an optical pulse signal encoded by the optical encoder does not exceed the time period corresponding to the transmission data rate. Specifically, since the optical encoder has the total duration of approximately 360 ps as mentioned above, optical pulses at the same wavelength encoded with the same code will not overlap with one another, as schematically shown in FIG. 12, when the data rate is set to be 2.5 Gps. FIG. 12 shows an encoded optical signal waveform with respect to the time axis, where optical waveforms of the respective bits are sequentially represented such as a first bit, a second bit, a third bit, ... (bit-1, bit-2, bit-3, ... ). As described above, the optical waveform of each bit has a time width (total duration) of approximately 360 ps, and a time slot has a time width of 400 ps at the data rate of 2.5 Gps, so that the optical waveforms of the respective bits will not overlap with one another on the time axis.

Figure 13:
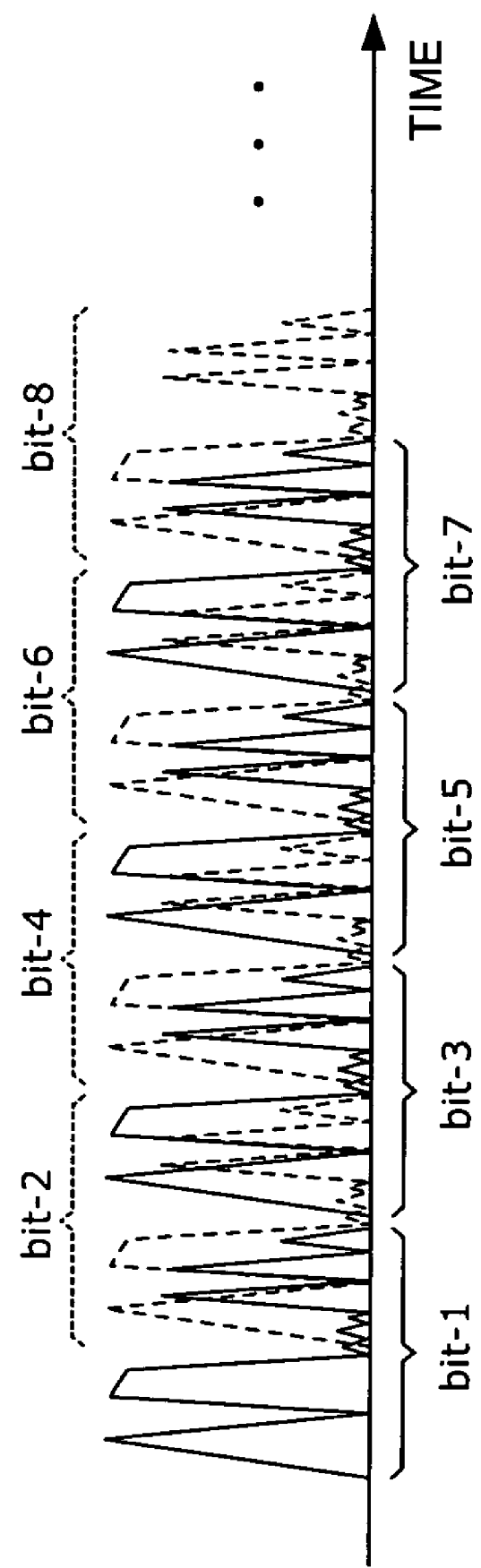
FIG. 13 is a schematic diagram showing an encoded optical signal waveform with respect to the time axis when the data rate is increased to 5 Gps using the optical encoder shown in FIG. 12.

FIG. 13 shows an encoded optical signal waveform with respect to time when the optical encoder having a encoding characteristics shown in FIG. 12 is used, and the data rate is increased to 5 Gps. In FIG. 13, even-numbered bits are indicated by solid lines, while odd-numbered bits are indicated by broken lines. Since the time slot has a time width of 200 ps when the data rate is at 5 Gps, the optical waveforms of the respective bits overlap with the optical waveforms of the preceding and subsequent bits.

The encoding/decoding apparatus in the third embodiment is similar in configuration to the encoding/decoding apparatus 30 illustrated in FIG. 7 except that the optical pulse generator 31 generates an optical RZ signal which has an optical pulse half width (FWHM) of 24 ps and a data rate of 5 Gps.

Figure 14A:
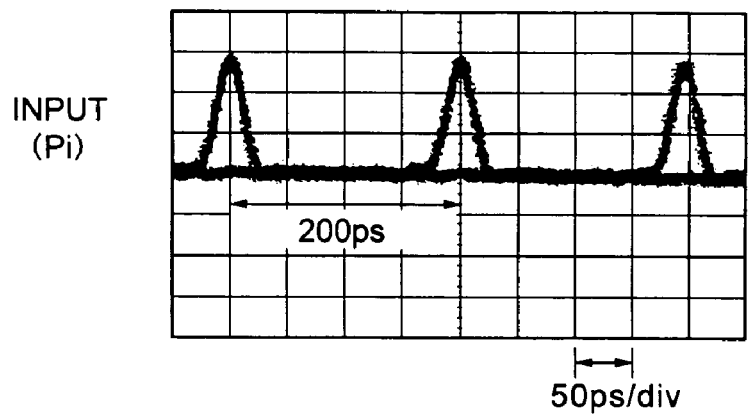
FIGS. 14A to 14C are diagrams showing the results of experiments made on an optical signal waveform Pi at 5 Gps applied to the encoder, an encoded signal waveform Pe from the encoder, and a decoded signal waveform Pd, respectively, in a third embodiment of the present invention.
Figure 14B:
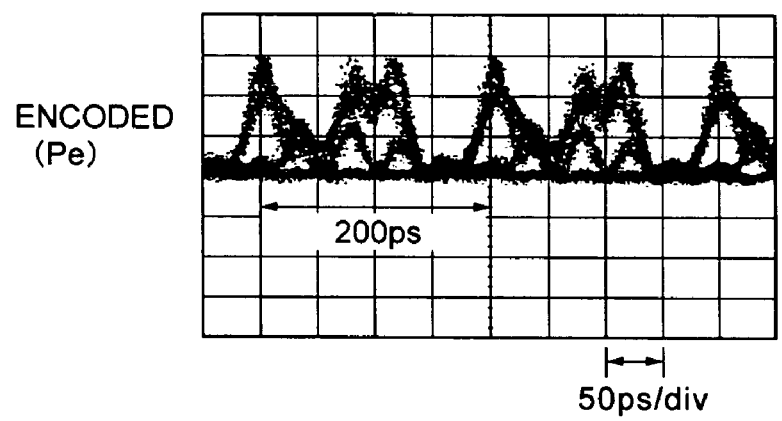
Figure 14C:
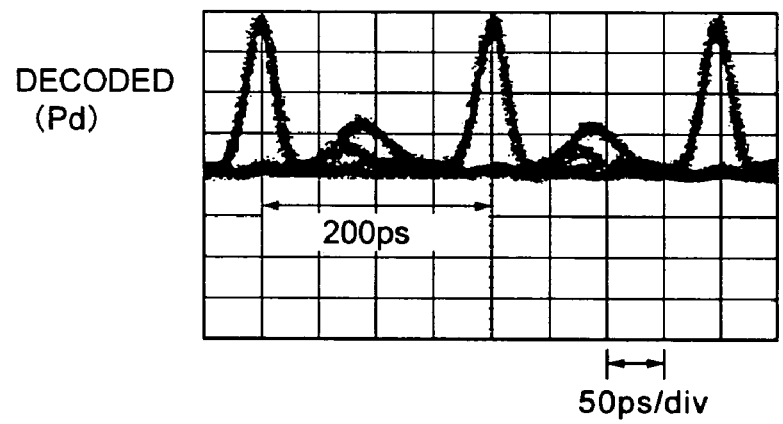

FIGS. 14A to 14C show the results of experiments made on an optical signal waveform Pi which is input to the encoder 11, an encoded signal waveform Pe from the encoder 11, and a decoded signal waveform Pd, respectively. It can be seen in the charts that the optical signal waveform Pi has a period of 200 ps, and that the encoded optical waveform Pe shows overlaps of optical waveforms corresponding to respective bits. It can be also seen that a well shaped eye opening can be provided from the decoded signal waveform Pd.

Figure 15:
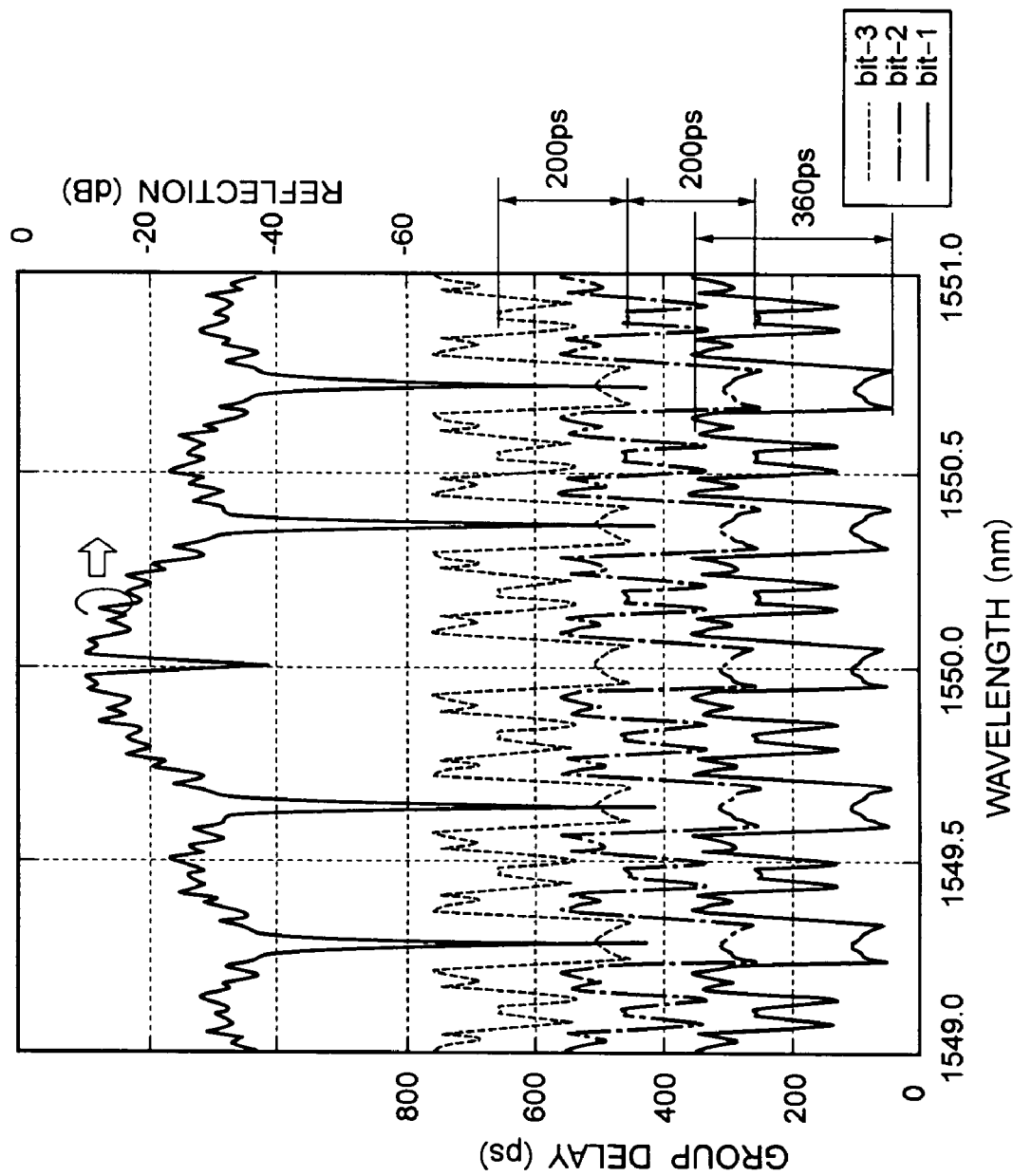
FIG. 15 is a diagram showing the result of an analysis on the group delay time characteristic, together with the reflection characteristic, when three consecutive pulses (bit-1, bit-2, bit-3) are applied to the encoder at a data rate of 5 Gps.

FIG. 15 shows the result of an analysis on the group delay time characteristic, together with the reflection characteristic, when the encoder 11 is applied with three consecutive pulses (bit-1, bit-2, bit-3) at the data rate of 5 Gbps. The group delay time characteristics of the three optical pulses (bit-1, bit-2, bit-3) are indicated by a solid line, a one-dot chain line, and a broken line, respectively. As shown in FIG. 15, the group delay time characteristic of the multiple phase shifted FBG used in the encoder 11 periodically varies with respect to the wavelength. Each pulse has a group delay time width (total duration) of approximately 360 ps, and there is a group delay time difference of 200 ps between the respective pulses, in which the group delay time difference corresponds to the data rate. As shown in FIG. 15, it is understood through a waveform analysis that even if encoded signals overlap with one another on time axis, the same waveform components do not overlap with one another at the same time in terms of a wavelength resolved analysis. In other words, it is understood that the multiple phase shifted FBG shown in the first and second embodiments can be used for an encoder and a decoder to provide sufficiently satisfactory encoding/decoding characteristics and transmission characteristic. In addition, even if the total duration of an encoded optical pulse signal exceeds the data rate, satisfactory and practical encoding/decoding and transmission can be provided by the encoder and the decoder. An encoding/decoding system and a transmission system are called the "data rate enhancement" system when the total duration of an encoded optical pulse signal exceeds the time period corresponding to the data rate. While the third embodiment has been described for an example in which the data rate is at 5 Gps, the present invention can be applied as well to a higher or a lower data rate.

Fourth Embodiment

Figure 16:
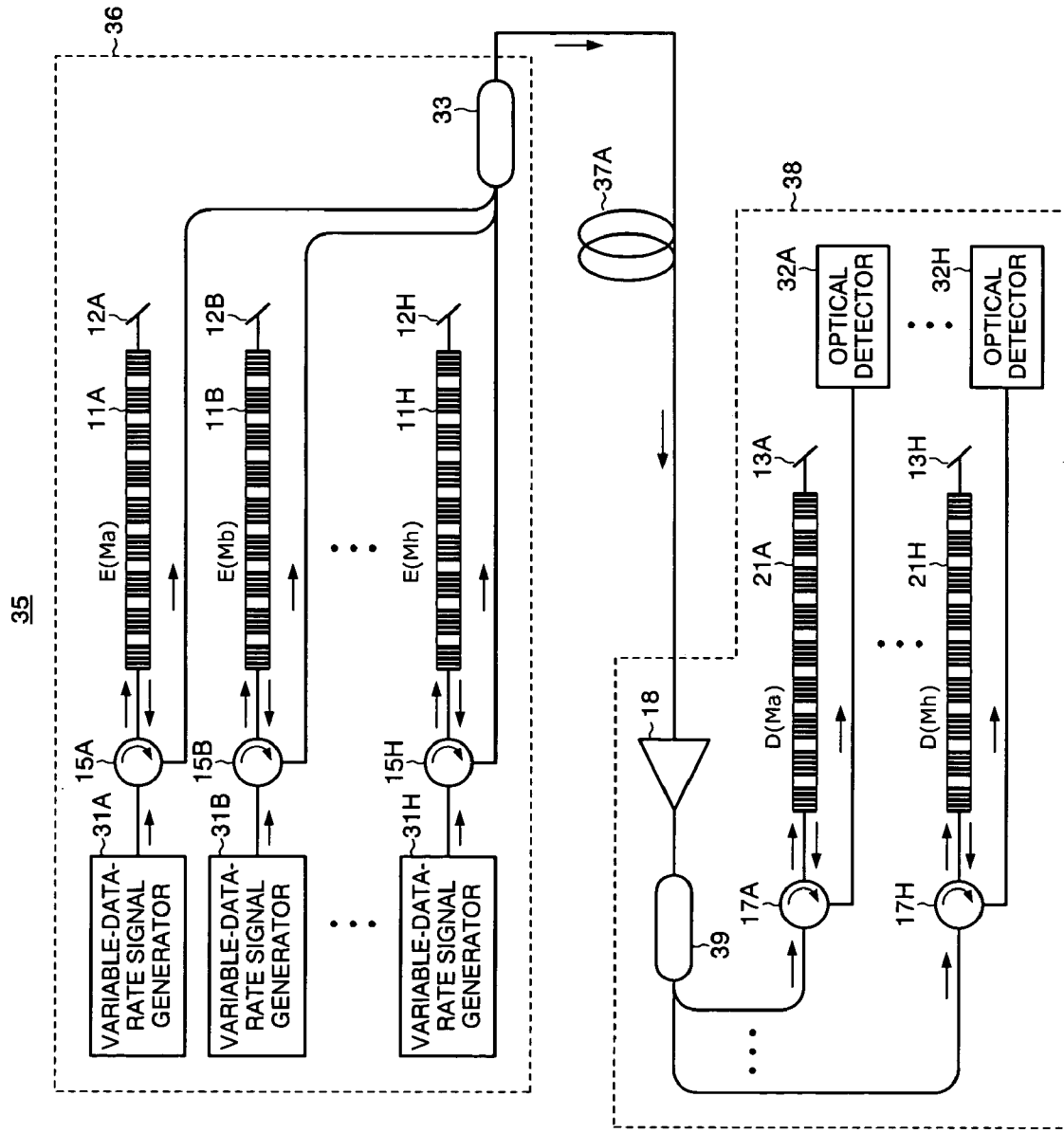
FIG. 16 is a block diagram illustrating the configuration of an OCDM communication apparatus according to a fourth embodiment of the present invention.

FIG. 16 is a block diagram illustrating the configuration of an optical code division multiplexing (OCDM) communication apparatus 35 according to a fourth embodiment of the present invention. The optical code division multiplexing communication apparatus 35 comprises an OCDM transmitter 36, an optical fiber 37A, and an OCDM receiver 38. The OCDM transmitter 36 includes eight transmission channels. For example, a first transmission channel is comprised of an optical pulse signal generator 31A which is a variable-data-rate light source which can adjust the data rate; an optical circulator 15A, and an optical encoder 11A. An optical pulse signal from the variable-data-rate optical pulse signal generator 31A is input to the optical encoder E(Ma) 11A through the optical circulator 15A, and is encoded by the optical encoder E(Ma) 11A corresponding to an M-sequence code Ma. Similarly, a second to an eighth transmission channel are comprised of variable-data-rate optical pulse signal generators 31B–31H; optical circulators 15B–15H; and optical encoders (E(Mb)–E(Mh)) 11B–11H, respectively. Optical pulse signals from the optical pulse signal generators 31B–31H are encoded by the optical encoders 11B–11H, respectively, and combined by an optical coupler 33. The optical pulse signal generators 31A–31H generate optical pulse signals of substantially the same wavelength. In addition, the optical encoders 11A–11H are configured as optical encoders which have M-sequence codes different from one another.

The combined optical encoded signal (OCDM signal) is received by the OCDM receiver 38 through an optical fiber 37A having, for example, a length of several tens of kilometers. The OCDM signal is amplified by the optical amplifier 18 by a predetermined gain in the OCDM receiver 38. The amplified OCDM signal is divided by an optical coupler 39 which serves as an optical power divider. The output optical signals from the optical coupler 39 are decoded by the respective optical decoders 21A–21H through the optical circulators 17A–17H. The optical decoders D(Ma)–D(Mh) 21A–21H are configured to decode the optical signals encoded by the optical encoders 11A–11H, respectively. The decoded optical signals are received by the optical detectors 32A–32H, respectively, which provide data transmitted through the respective transmission channels.

The data rates of the respective transmission channels can be adjusted by the variable-data-rate optical pulse signal generators 31A–31H. For example, all the transmission channels may be used at the data rate of 2.5 Gps, and the data rates of all or some of the transmission channels may be increased, for example, to 5 Gps in response to an increase in transmission capacity or the like. In this instance, the data-rate enhancement method of the present invention does not require any change in other conditions including the optical pulse widths, but can increase the capacity (data rate) of the overall apparatus simply by increasing the data rate of optical signal. Likewise, the channel rates of all or some of the transmission channels may be reduced, for example, to 1.25 Gps.

While the fourth embodiment has shown an example in which the communication apparatus has eight transmission channels and eight reception channels, any number of transmission and reception channels can be provided as appropriate in accordance with the number of codes. it should be noted that the number of reception channels need not be equal to the number of transmission channels.

Fifth Embodiment

Figure 17:
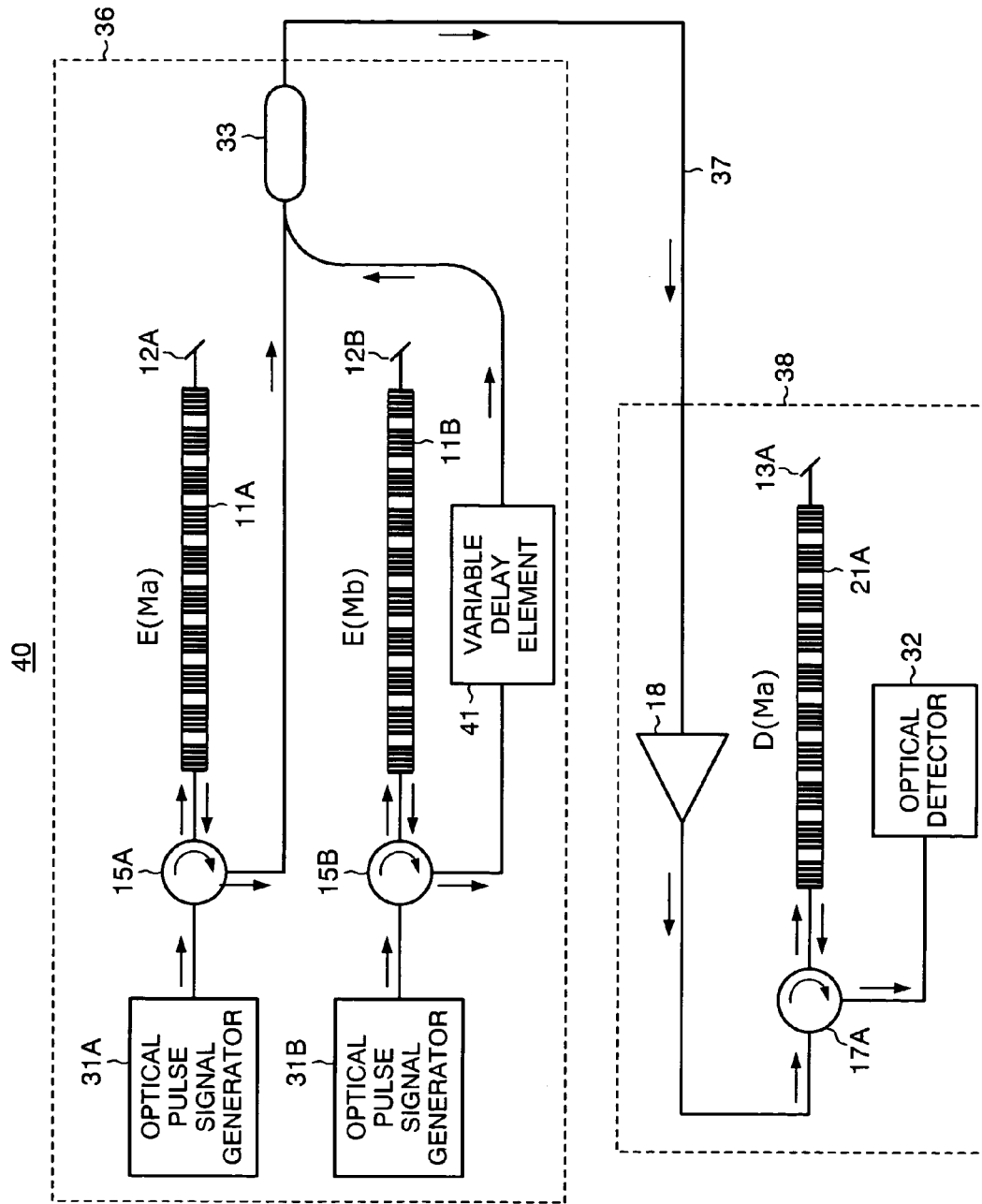
FIG. 17 is a block diagram illustrating the configuration of an OCDM communication apparatus according to a fifth embodiment of the present invention.

FIG. 17 is a block diagram illustrating the configuration of an optical code division multiplexing (ODCM) communication apparatus 40 according to a fifth embodiment of the present invention. The OCDM transmission apparatus 40 is similar in configuration to the second embodiment illustrated in FIG. 9 except for a delay element provided in one transmission channel.

Specifically, encoded signals from a first and second transmission channels are combined by an optical coupler 33, and transmitted through an optical fiber 37. More specifically, an optical pulse signal generator 31A, an optical circulator 15A, and an optical encoder E(Ma) 11A make up a first transmission channel, while an optical pulse signal generator 31B, an optical circulator 15B, an optical encoder E(Mb) 11B, and a variable delay element 41 make up a second transmission channel. Each of the optical pulse generators 31A, 31B generates a pseudo-random optical RZ signal which has an optical pulse half width of 24 ps, and a data rate of 2.5 Gps. The optical pulse signal from the optical pulse signal generator 31A is encoded by the optical encoder E(Ma) 11A with an M-sequence code Ma, while the optical pulse signal from the optical pulse signal generator 31B is encoded by the optical encoder E(Mb) 11B with an M-sequence code Mb. In the fifth embodiment, the encoded signal encoded by the optical encoder E(Mb) 11B is delayed by the variable delay element 41, and coupled with an encoded signal from the optical encoder E(Ma) 11A by the optical coupler 33. The location at which the delay element 41 is provided is not limited the location after the optical encoder E(Mb) 11B. In other words, the delay element 41 can be provided at a location at which the associated encoded signal can be delayed relative to the other channel. The delay element 41 may be provided, for example, in front of the optical encoder E(Mb) 11B.

Figure 18:
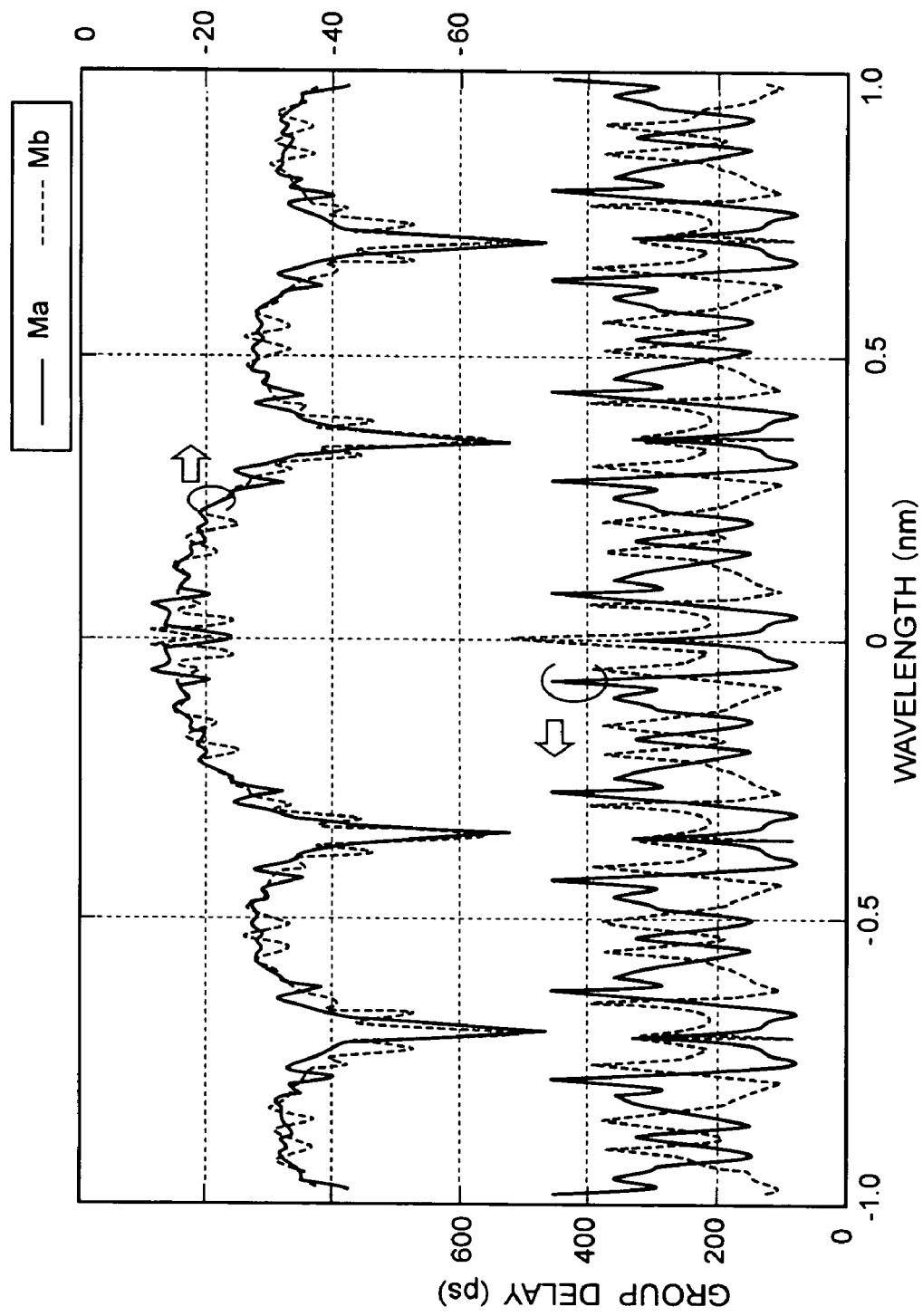
FIG. 18 is a diagram showing the result of an analysis on the group delay time characteristic of each of encoders E(Ma), E(Mb) associated with the M-sequence codes Ma, Mb.

FIG. 18 shows the group delay time characteristics of the respective encoders E(Ma) 11A, E(Mb) 11B with the M-sequence codes Ma (000111101011001), Mb (000100110101111) normalized by the Bragg wavelength of uniform gratings which make up the encoders. While the delay time characteristics of multiple phase shifted FBGs used in the encoders periodically varies with respect to the wavelength, a different code results in a different pattern in which the delay time characteristic periodically varies with respect to the wavelength, and signal components at the same wavelength exist at the same time only in very small regions (only in intersecting portions of the delay time characteristics). While the optical powers at the intersecting portions interfere with each other depending on their relative phase condition, the interferences merely slightly affects the optical power of the overall encoded signal. It can therefore be understood that the influence of the interference can be minimized by setting an appropriate delay time between multiplexed optical encoded signals. In other words, even if encoded signals at the same wavelength are multiplexed in the same time slot, the influence of the interference can be minimized by providing a delay time difference between the encoded signals, when the encoding patterns are different.

Figure 19:
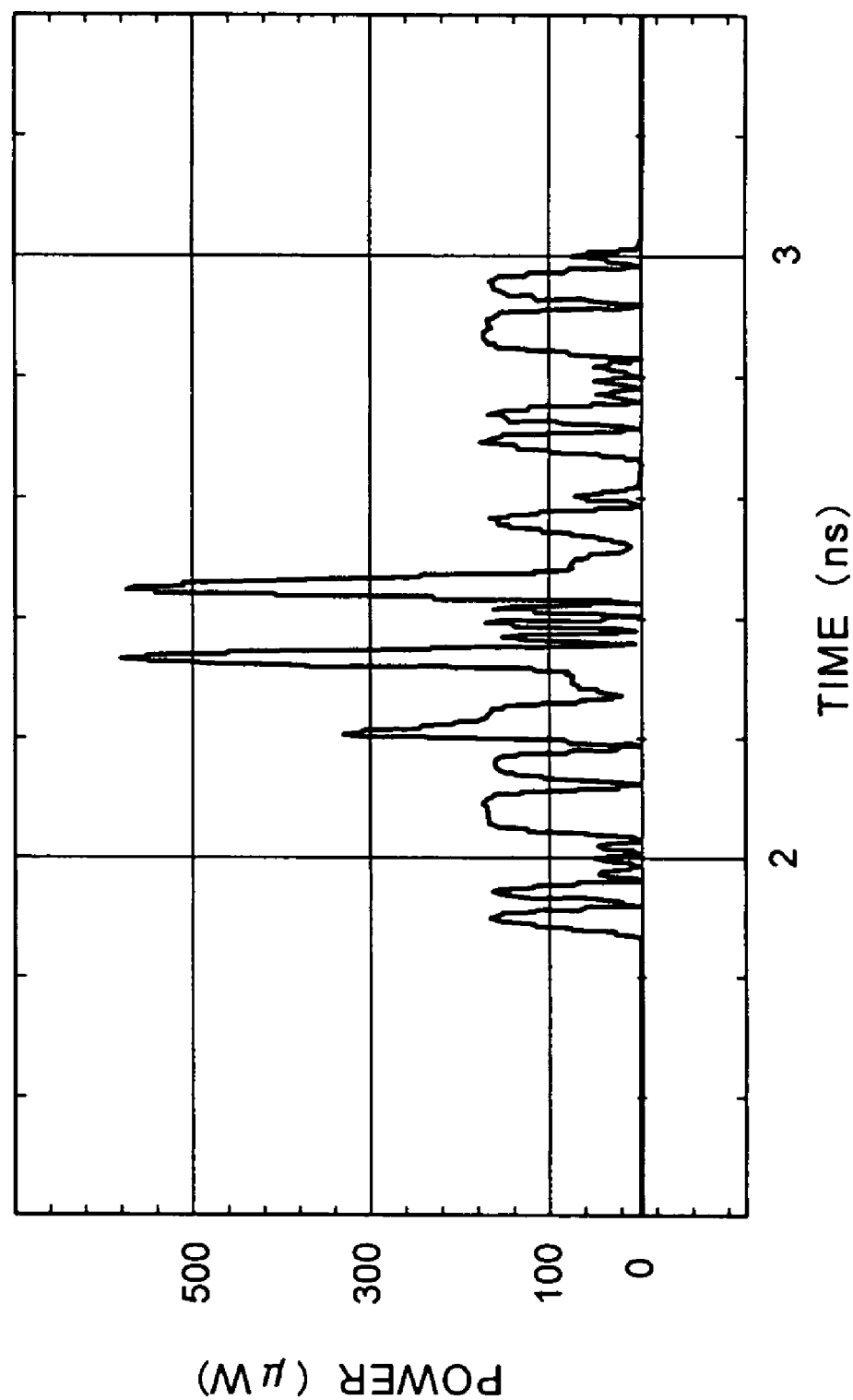
FIG. 19 is a diagram showing the result of a simulation for signal waveforms corresponding to (0,1,0) of the M-sequence code Ma, and (1,1,1) of the M-sequence code Mb.
Figure 20:
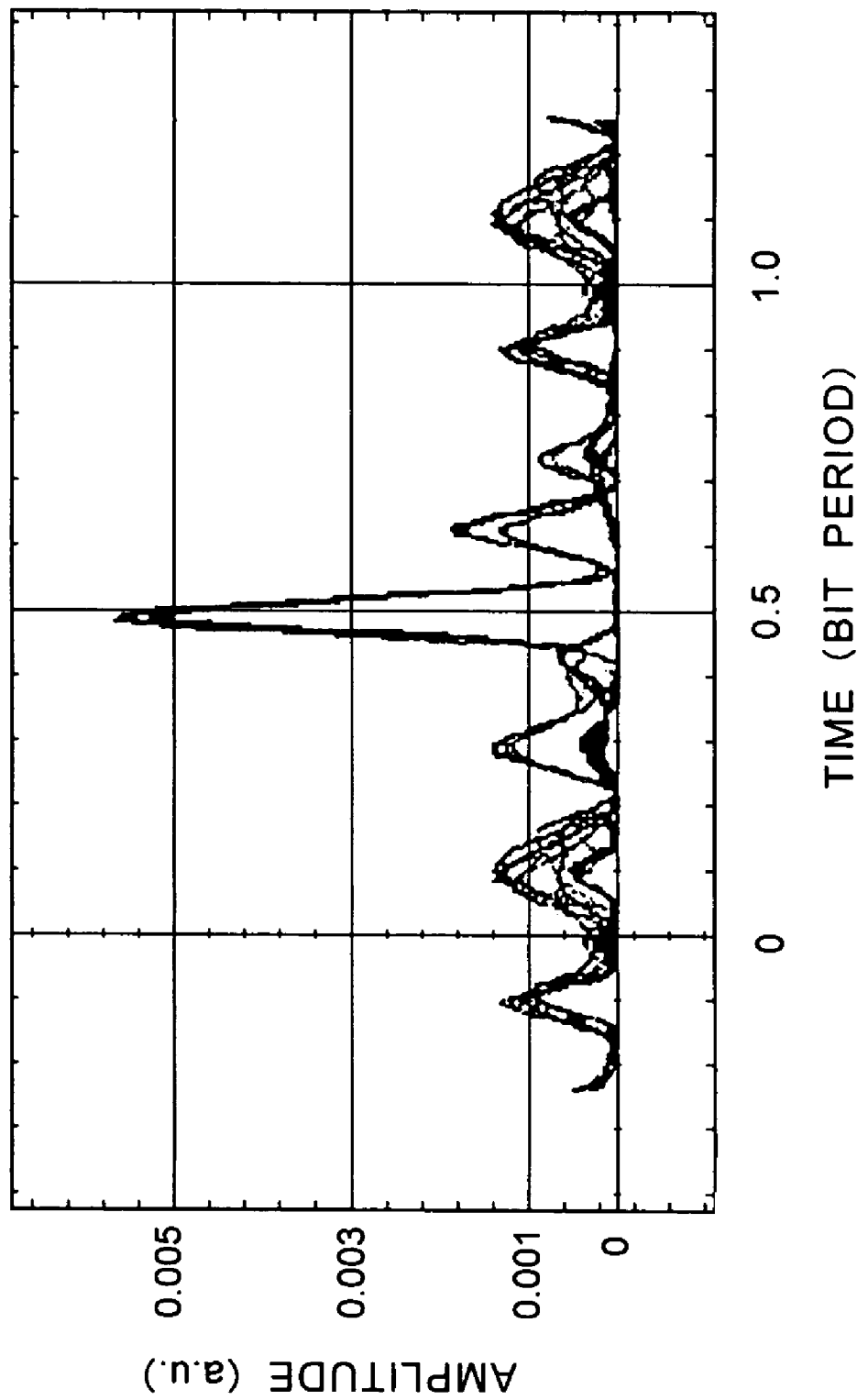
FIG. 20 is a diagram showing a decoded signal waveform (eye pattern) of the optically encoded multiplexed signal shown in FIG. 19.

In the fifth embodiment, the variable delay element 41 provides a delay time of 72 ps which corresponds to three code chips. FIG. 19 shows the simulation result for signal waveforms corresponding to (010) of the M-sequence code Ma and (111) of the M-sequence code Mb. As shown in FIG. 19, optically encoded signals of the same wavelength encoded by the encoders E(Ma) 11A, E(Mb) 11B temporally (i.e., on the time axis) overlap with each other in transmission. Also, as shown in a simulation result in FIG. 20, an extremely satisfactory eye opening can be observed in a decoded signal waveform (eye pattern). It is understood that the transmission characteristic is improved by providing a delay time. It is appreciated from the results that the foregoing optical code division multiplexing apparatus can provide for satisfactory encoding/decoding performance as well as transmission capability.

Sixth Embodiment

The foregoing fifth embodiment has been described in connection with an example in which the data rate is 2.5 Gps. In the sixth embodiment described below, channels of different data rates are mixed in an OCDM communication apparatus to which the data rate enhancement method is applied.

Figure 21:
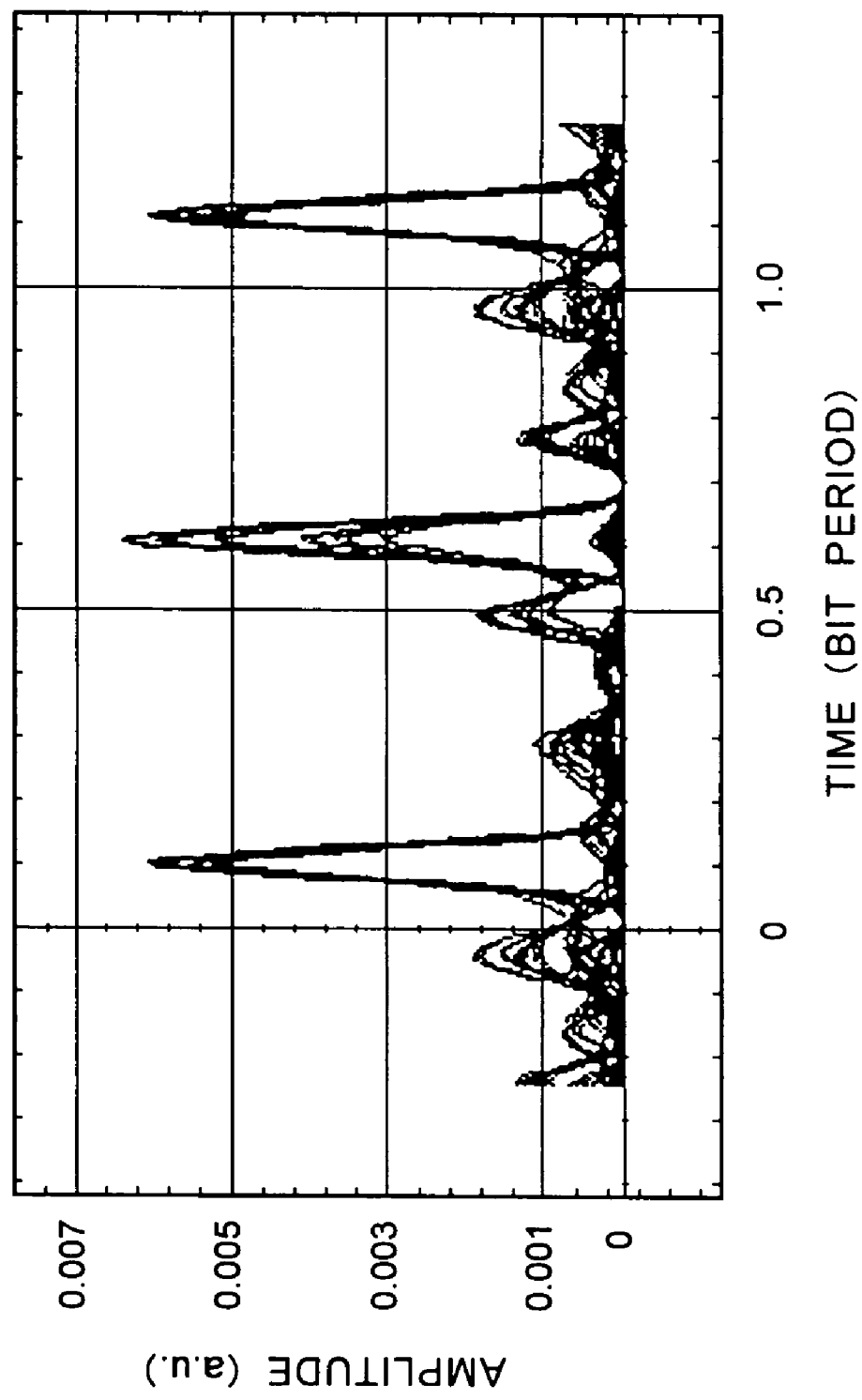
FIG. 21 is a diagram showing the result of a simulation for a decoded signal waveform in the OCDM communication apparatus illustrated in FIG. 17 when it employs pseudo-random optical RZ signals having the data rate of 5 Gps and 2.5 Gps, respectively.

FIG. 21 shows the result of a simulation for a decoded signal waveform when the optical pulse signal generators 31A, 31B generate pseudo-random optical RZ signals having the data rates of 5 Gps and 2.5 Gps, respectively, in the OCDM communication apparatus 40 illustrated in FIG. 17. The delay element 41 provides a delay time of 72 ps which corresponds to three code chips. One bit period on the horizontal axis corresponds to 400 ps. As shown, an extremely satisfactory eye opening is observed. It is understood from the eye opening that the transmission characteristic is improved by providing a delay time. It is appreciated from these results that the foregoing optical code division multiplex apparatus can provide satisfactory encoding/decoding performance as well as transmission capability.

Figure 22:
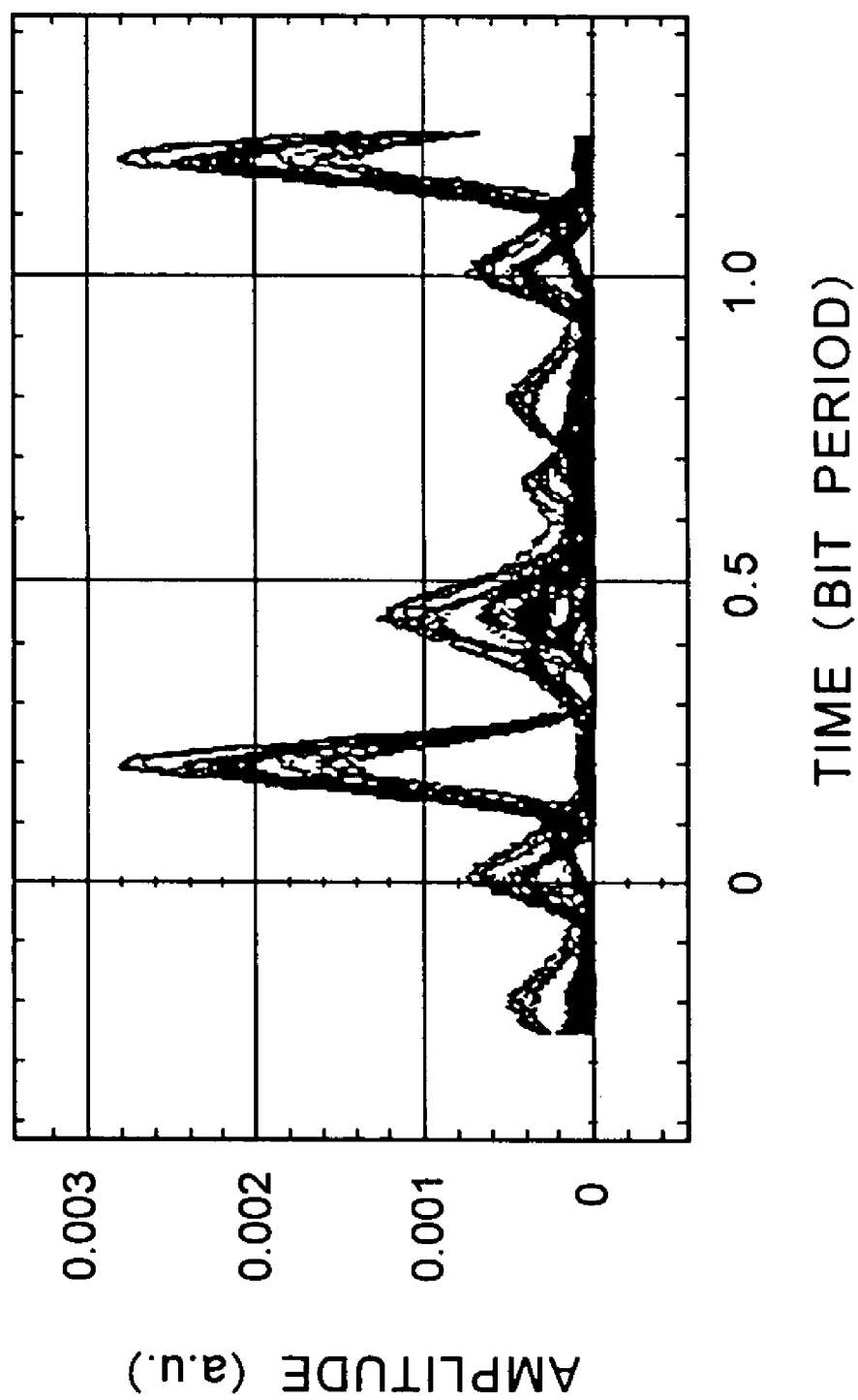
FIG. 22 is a diagram showing the result of a simulation for a decoded signal waveform when two pseudo-random optical RZ signals having the data rate of 5 Gps are used.

FIG. 22 shows an exemplary result of a simulation for a decoded signal waveform when both the optical signal generators 31A, 31B generate pseudo-random optical RZ signals having the data rate of 5 Gps. The delay element 41 provides a delay time of 72 ps which corresponds to three chips. Similarly, one bit period on the horizontal axis corresponds to 400 ps. As shown, an extremely satisfactory eye opening is observed. It is understood from the eye opening that the transmission characteristic is improved by providing a delay time. It was also verified that a satisfactory eye opening was observed even when the delay time provided by the delay element 41 is varied to be integer multiples of the chip period Tchip (24 ps). Conversely, even when the delay time provided by the delay element 41 is reduced to the time slot of the optical signal (i.e., inverse of the data rate) divided by an integer multiple, a satisfactory eye opening is provided, so that the OCDM communication apparatus 40 can provide satisfactory encoding/decoding performance as well as a transmission capability. Moreover, not limited to the foregoing variations, satisfactory transmissions can be provided by adjusting the delay time of the delay element 41.

As described above, the present invention can be applied as well when channels of different data rates are provided. The present invention can also be used in combination with the data rate enhancement method. Further, the present invention can be applied to any data rate.

Seventh Embodiment

Figure 23:
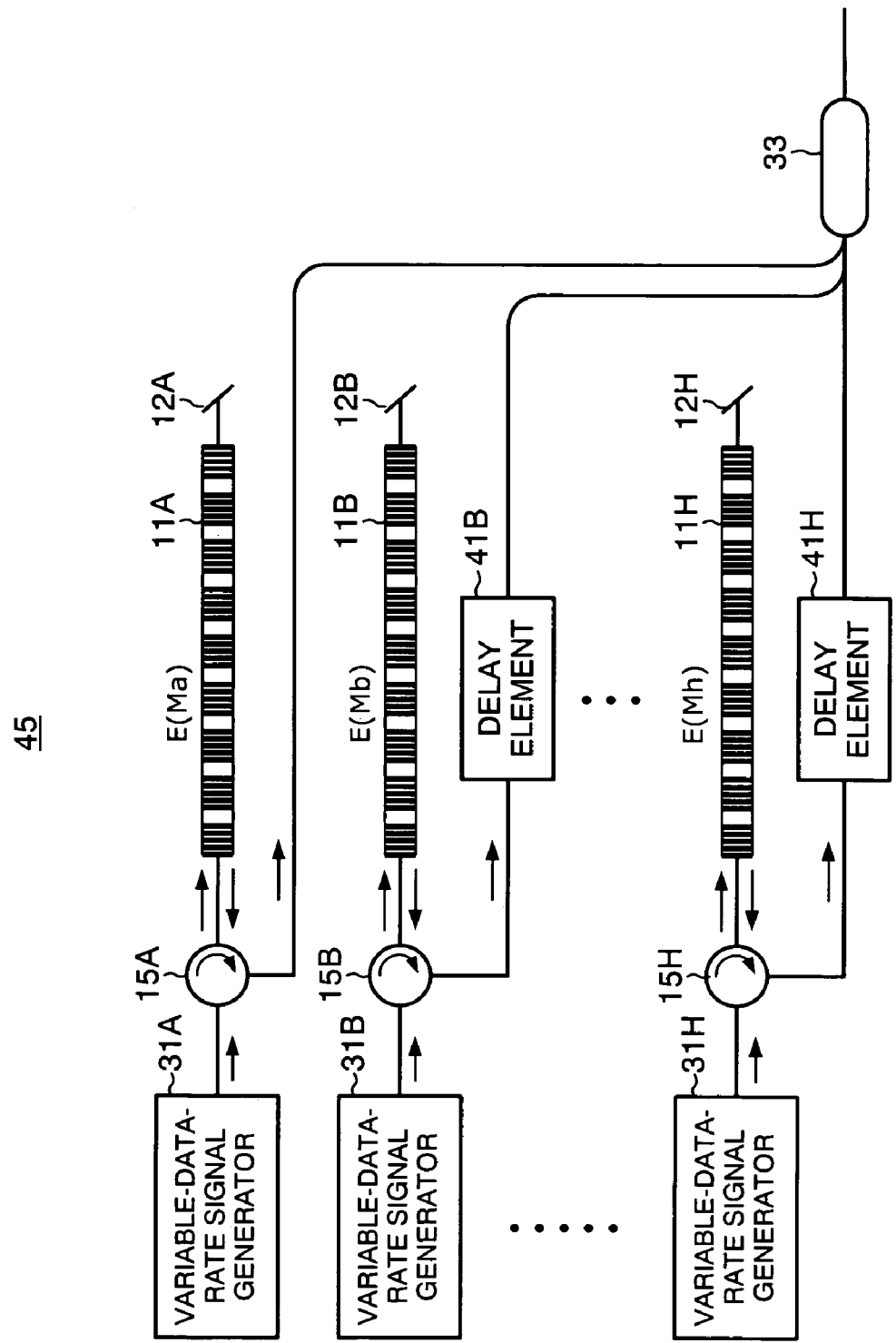
FIG. 23 is a block diagram illustrating the configuration of an optical code division multiplexing apparatus according to a seventh embodiment of the present invention.

FIG. 23 is a block diagram illustrating the configuration of an optical code division multiplexing apparatus 45 according to a seventh embodiment of the present invention. The code division multiplexing apparatus 45 includes eight transmission channels. A first transmission channel is comprised of a variable-data-rate optical pulse signal generator 31A, an optical circulator 15A, an optical encoder 11A, and an optical terminator 12A. A second to an eighth channel are similar in configuration to the first transmission channel, except for variable delay elements 41B–41H which are provided for delaying encoded signals from the optical encoders 11B–11H, respectively. By providing the variable delay elements 41B–41H, encoded signals from the first to eighth transmission channels are delayed relative to one another before they are combined by an optical coupler 33.

The optical encoders 11A–11H are configured as M-sequence code optical encoders different from one another. Delay times between respective channels can be determined based on a code, the number of chips, the data rate of the optical pulse signal, an optical pulse width, and the like used for each channel, but may instead be determined based on actual transmission characteristics. In other words, each of the variable delay elements 41B–41H may be adjusted in delay time to provide the best actual transmission characteristics. The transmission characteristics herein referred to maybe those characteristics which are generally utilized for evaluating the transmission characteristics, such as a bit-error-rate, an S/N ratio, a C/N ratio, and the like. Alternatively, relative delay times between the respective channels may be made constant. For example, the variable delay elements 41B–41H can be adapted to provide delay times which correspond to 3, 6, 9, . . . , 21 chips, respectively.

As described above, an appropriate delay time provided between multiplexed encoded signals can result in a more satisfactory eye opening and improved transmission characteristics.

While the foregoing embodiments have been described in connection with examples in which the multiple phase shifted FBG is used in the encoder and decoder, the waveguide is not limited to an optical fiber. For example, a planar channel optical waveguide may be provided instead of the optical fiber.

As described above, in the phase code multiplexing communication system using a multiple phase shift Bragg grating waveguide in an encoder, different encoded signals of the same wavelength can be multiplexed in the same time slot, resulting in dramatic improvements in the wavelength utilization efficiency of an optical communication system. More specifically, the phase code multiplexing communication system which employs the multiple phase shifted Bragg grating waveguides in the encoder and/or decoder can not only be applied to a data rate which has a period shorter than a code total duration but also dynamically vary the data rate. Thus, the resulting optical communication system can advantageously control the communication bandwidth by flexibly changing the transmission speed and the like.

The encoder/decoder using a multiple phase shifted Bragg grating waveguide are advantageous in that they are extremely simple, inexpensive and compact as optical devices. Generally, a short pulse light source becomes more complicated and expensive as the optical pulse width becomes narrower, whereas the aforementioned data rate enhancement method permits the use of a more simple and inexpensive pulse light source.

It is therefore possible to readily increase the transmission capacity in response to an increase in the demands for communication traffic. In addition, since such an increase in the transmission capacity can be carried out simply by increasing the data rate of the transmission light source, the system can be upgraded at an extremely low cost in a short time. Furthermore, the WDM technology and the like can be used in combination to further enhance communication channels to increase the transmission capacity.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2002-337244 and No. 2002-337245 which are hereby incorporated by reference.

What is claimed is:

1. An optical signal converter for use in optical code division multiplexing based on a binary phase optical code, comprising:

a grating waveguide having an identical number of uniform pitch gratings to the number of code chips of the binary phase optical code, said uniform pitch gratings being formed in a waveguide direction to reflect light of a predetermined wavelength, wherein adjacent uniform pitch gratings corresponding to a position at which the optical code value changes are disposed a spacing apart from each other to give a phase shift of $(2m+1)\pi/2$ ("m" is an integer) to the light of the predetermined wavelength, and the remaining adjacent uniform pitch gratings are disposed a spacing apart from each other to give a phase shift of $n\pi$ ("n" is an integer) to the light of the predetermined wavelength.

2. An optical signal converter according to claim 1, wherein the spacing of said uniform pitch gratings is determined such that said uniform pitch gratings provide substantially constant light propagation delay time differences.

3. An optical signal converter according to claim 1, wherein at least one of said uniform pitch gratings is an apodized grating.

4. An optical signal converter according to claim 1, wherein at least one of said adjacent uniform pitch gratings corresponding to a position at which the optical code value change is an apodized grating.

5. An optical signal converter according to claim 1, wherein said uniform pitch gratings have one of a sinusoidal, rectangular and triangular refractive index profiles.

6. An optical signal converter according to claim 1, wherein said grating waveguide comprises an optical fiber.

7. An optical signal converter according to claim 1, wherein said grating waveguide comprises a planar channel waveguide.

8. An optical encoder for performing binary phase optical encoding for use in an optical code division multiplexing apparatus, comprising:

an optical waveguide grating having an identical number of uniform pitch gratings to the number of code chips of the binary phase optical code, said uniform pitch gratings being formed in a waveguide direction of an optical waveguide to reflect light of a predetermined wavelength, wherein adjacent uniform pitch gratings corresponding to a position at which the optical code value changes are disposed a spacing apart from each other to give a phase shift of $(2m+1)\pi/2$ ("m" is an integer) to the light of the predetermined wavelength, and the remaining adjacent uniform pitch gratings are disposed a spacing apart from each other to give a phase shift of $n\pi$ ("n" is an integer) to the light of the predetermined wavelength.

9. An optical encoder according to claim 8, wherein the length of said uniform pitch gratings and the spacing between said uniform pitch gratings are determined such that said respective uniform pitch gratings provide substantially the same light propagation delay time.

10. An optical encoder according to claim 8, wherein said optical waveguide comprises an optical fiber.

11. An optical encoder according to claim 8, wherein said optical waveguide comprises a planar channel waveguide.

12. An optical decoder for decoding an optical code division multiplexed optical signal by binary phase optical encoding, comprising:

an optical waveguide grating having an identical number of uniform pitch gratings to the number of code chips of the binary phase optical code, said uniform pitch gratings being formed in a waveguide direction of an optical waveguide to reflect the optical code division multiplexed optical signal, wherein adjacent uniform pitch gratings corresponding to a position at which the optical code value changes are disposed a spacing apart from each other to give a phase shift of $(2m+1)\pi/2$ ("m" is an integer) to the optical code division multiplexed optical signal, and the remaining adjacent uniform pitch gratings are disposed a spacing apart from each other to give a phase shift of $n\pi$ ("n" is an integer) to the optical code division multiplexed optical signal.

13. An optical decoder according to claim 12, wherein said optical waveguide comprises an optical fiber.

14. An optical decoder according to claim 12, wherein said optical waveguide comprises a planar channel waveguide.

15. An optical signal converter for use in an optical code division multiplexing apparatus which performs optical code division multiplexing using binary phase optical codes, comprising:

a grating waveguide encoder having an identical number of uniform pitch gratings to the number of code chips of the binary phase optical code, said uniform pitch gratings being formed in the waveguide direction of an optical waveguide through phase shift portions each for optically coupling each of said uniform pitch gratings in series in the waveguide direction, and said uniform pitch gratings reflecting light of a predetermined wavelength; and an optical attenuator optically coupled at a dead-end terminal of said grating waveguide encoder, wherein said phase shift portions corresponding to a position at which the optical code value changes have a phase shift amount equal to $(2m+1)\pi/2$ ("m" is an integer), and the remaining phase shift portions have a phase shift amount equal to $n\pi$ ("n" is an integer).

16. An optical code division multiplexing apparatus for performing optical code division multiplexing using binary phase optical codes, comprising:

at least one optical pulse signal generator for generating an optical pulse signal of a predetermined wavelength; and at least one grating waveguide encoder having uniform pitch gratings the number of which is identical to the number of code chips for one of the binary phase optical codes associated therewith, said uniform pitch gratings being formed in a waveguide direction of an optical waveguide to reflect the optical pulse signal from the optical pulse signal generator associated therewith, and each of said at least one grating waveguide encoder encoding the optical pulse signal from one of said optical pulse signal generators associated therewith, wherein adjacent uniform pitch gratings corresponding to a position at which the optical code value changes are disposed a spacing apart from each other to give a phase shift of $(2m+1)\pi/2$ ("m" is an integer) to the corresponding optical pulse signal, and the remaining adjacent uniform pitch gratings are disposed a spacing apart from each other to give a phase shift of $n\pi$ ("n" is an integer) to the corresponding optical pulse signal.

17. An optical code division multiplexing apparatus according to claim 16, wherein at least one of said optical pulse signal generators generates an optical pulse signal at a pulse period equal to or less than a total duration of a grating waveguide encoder which encodes the optical pulse signal.

18. An optical code division multiplexing apparatus according to claim 16, further comprising an adjuster for adjusting the period of the optical pulse signal generated by at least one of said optical pulse signal generators.

19. An optical code division multiplexing apparatus according to claim 16, wherein said uniform pitch grating has a Bragg wavelength $\lambda b$ which satisfies $\lambda p - \Delta\lambda \leq \lambda b \leq \lambda p + \Delta\lambda$, where $\lambda p$ is the wavelength of the optical pulse signal, and $\Delta\lambda$ is the wavelength corresponding to the inverse of a chip period of the encoded signal.

20. An optical code division multiplexing apparatus according to claim 16, wherein at least one of said optical pulse signal generators generates an optical pulse signal at a period different from the periods of optical pulse signals generated by the remaining optical pulse signal generators.

21. An optical code division multiplexing apparatus according to claim 16, further comprising an optical coupler for combining encoded optical signals reflected from said grating waveguide encoders.

22. An optical code division multiplexing apparatus according to claim 16, wherein said optical waveguide comprises an optical fiber.

23. An optical code division multiplexing apparatus according to claim 16, wherein said optical waveguide comprises a planar channel waveguide.

24. An optical code division demultiplexing apparatus for demultiplexing a multiplexed optical pulse signal which is optical code division multiplexed using binary phase optical encoding, said apparatus comprising:

at least one grating waveguide decoder having uniform pitch gratings the number of which is identical to the number of code chips of a binary phase optical code associated therewith, said uniform pitch gratings being formed in a waveguide direction of an optical waveguide and reflecting the multiplexed optical pulse signal to generate a decoded optical signal; and at least one optical detector for detecting the decoded optical signal from said at least one grating waveguide decoder, respectively, wherein adjacent uniform pitch gratings corresponding to a position at which the optical code value changes are disposed a spacing apart from each other to give a phase shift of $(2m+1)\pi/2$ ("m" is an integer) to the multiplexed optical pulse signal, and the remaining adjacent uniform pitch gratings are disposed a spacing apart from each other to give a phase shift of $n\pi$ ("n" is an integer) to the multiplexed optical pulse signal.

25. An apparatus according to claim 24, wherein said optical waveguide comprises an optical fiber.

26. An apparatus according to claim 24, wherein said optical waveguide comprises a planar channel waveguide.

27. An optical code division multiplexing apparatus for performing optical code division multiplexing using binary phase optical codes, comprising:

a plurality of grating waveguide encoders each having an identical number of uniform pitch gratings to the number of code chips of a binary phase optical code associated therewith, said uniform pitch gratings being formed in a waveguide direction of an optical waveguide to reflect an input optical signal, and each of said plurality of grating waveguide encoders encoding the input optical signal; and at least one delay element for delaying respective encoded signals from said plurality of grating waveguide encoders relative to one another, wherein adjacent uniform pitch gratings corresponding to a position at which the optical code value changes are disposed a spacing apart from each other to give a phase shift of $(2m+1)\pi/2$ ("m" is an integer) to the input optical signal, and the remaining adjacent uniform pitch gratings are disposed a spacing apart from each other to give a phase shift of $n\pi$ ("n" is an integer) to the input optical signal.

28. An optical code division multiplexing apparatus according to claim 27, wherein each of said grating waveguide encoders comprises an optical fiber grating.

29. An optical code division multiplexing apparatus according to claim 27, wherein said at least one delay element delays the respective encoded signals from said plurality of grating waveguide encoders relative to one another by a time corresponding to an integer multiple of a chip period of the optical codes.

30. An optical code division multiplexing apparatus according to claim 27, wherein said at least one delay element delays the respective encoded signals from said plurality of grating waveguide encoders relative to one another by a time corresponding to a data rate of the input optical signal divided by an integer.

31. An optical code division multiplexing apparatus according to claim 27, further comprising an optical coupler for combining the delayed encoded signals.

32. An optical code division multiplexing apparatus according to claim 27, wherein each of said plurality of grating waveguide encoders comprises an optical attenuator optically coupled to a terminal end thereof.

33. An optical code division multiplexing apparatus according to claim 27, wherein said uniform pitch gratings have a Bragg wavelength $\lambda b$ which satisfies $\lambda p - \Delta\lambda \leq \lambda b \leq \lambda p + \Delta\lambda$, where $\lambda p$ is the wavelength of the optical pulse signal, and $\Delta\lambda$ is the wavelength corresponding to the inverse of a chip period of the encoded signal.

34. An optical code division multiplexing communication apparatus for performing an optical code division multiplexing using binary phase optical codes, comprising:

a plurality of optical pulse signal generators each for generating an optical pulse signal of a predetermined wavelength;

a plurality of grating waveguide encoders, each having an identical number of uniform pitch gratings to the number of code chips of a binary phase optical code associated therewith, said uniform pitch gratings being formed in a waveguide direction of an optical waveguide to reflect the optical pulse signal, and each said grating waveguide encoder encoding the optical pulse signal from one of said optical pulse signal generators; and at least one delay element for delaying respective encoded signals from said plurality of grating waveguide encoders relative to one another, wherein adjacent uniform pitch gratings corresponding to a position at which the optical code value changes are disposed a spacing apart from each other to give a phase shift of $(2m+1)\pi/2$ ("m" is an integer) to the optical pulse signal, and the remaining adjacent uniform pitch gratings are disposed a spacing apart from each other to give a phase shift of $n\pi$ ("n" is an integer) to the optical pulse signal.

35. An optical code division multiplexing communication apparatus according to claim 34, wherein said grating waveguide encoders each comprise an optical fiber grating.

36. An optical code division multiplexing communication apparatus according to claim 34, wherein said at least one delay element delays the respective encoded signals from said plurality of grating waveguide encoders relative to one another by a time corresponding to an integer multiple of a chip period of the optical codes.

37. An optical code division multiplexing communication apparatus according to claim 34, wherein said at least one delay element delays the respective encoded signals from said plurality of grating waveguide encoders relative to one another by a time corresponding to a data rate of the input optical signal divided by an integer.

38. An optical code division multiplexing communication apparatus according to claim 34, wherein at least one of said optical pulse signal generators generates an optical pulse signal at a pulse period equal to or less than a total duration of said grating waveguide encoders.

39. An optical code division multiplexing communication apparatus according to claim 34, further comprising an optical coupler for combining the delayed encoded signals.

40. An optical code division multiplexing communication apparatus according to claim 34, wherein each of said plurality of grating waveguide encoders comprises an optical attenuator optically coupled to a terminal end thereof.

41. An optical code division multiplexing communication apparatus according to claim 34, wherein said uniform pitch gratings have a Bragg wavelength $\lambda b$ which satisfies $\lambda p - \Delta\lambda \leq \lambda b \leq \lambda p + \Delta\lambda$, where $\lambda p$ is the wavelength of the optical pulse signal, and $\Delta\lambda$ is the wavelength corresponding to the inverse of a chip period of the encoded signal.

* * * * *